US012532179B2

(12) United States Patent
Balmakhtar et al.

(10) Patent No.: US 12,532,179 B2
(45) Date of Patent: Jan. 20, 2026

(54) SYSTEMS AND METHODS FOR QUANTUM-BASED NETWORK TRAFFIC ANOMALY DETECTION

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 154 days.

(21) Appl. No.: 18/470,987

(22) Filed: Sep. 20, 2023

(65) Prior Publication Data

US 2025/0097709 A1 Mar. 20, 2025

(51) Int. Cl.
*H04W 12/122* (2021.01)
*G06N 10/60* (2022.01)

(52) U.S. Cl.
CPC .......... *H04W 12/122* (2021.01); *G06N 10/60* (2022.01)

(58) Field of Classification Search
CPC .... H04W 12/12; H04W 12/122; G06N 10/60; G06N 10/00; H04L 63/1408; H04L 63/1425; H04L 63/1441
See application file for complete search history.

(56) References Cited

U.S. PATENT DOCUMENTS

| | | | | |
|---|---|---|---|---|
| 9,727,824 B2* | 8/2017 | Rose | ................. | G06V 10/955 |
| 10,091,651 B2* | 10/2018 | Orcutt | ................. | H04W 12/06 |
| 11,501,195 B2* | 11/2022 | Rose | ................. | G06N 20/00 |
| 12,206,702 B2* | 1/2025 | Routt | ................. | H04L 63/1441 |

(Continued)

FOREIGN PATENT DOCUMENTS

| | | |
|---|---|---|
| CN | 110690961 A | 1/2020 |
| CN | 115905863 A | 4/2023 |

OTHER PUBLICATIONS

Quantum Inspire, "Code example: Quantum classification", By QuTech, Retrieved from Internet URL: https://www.quantum-inspire.com/kbase/quantum-classification/, accessed on Sep. 8, 2023, 7 pages.

(Continued)

*Primary Examiner* — Hosuk Song
(74) *Attorney, Agent, or Firm* — Shook, Hardy & Bacon L.L.P.

(57) ABSTRACT

In various embodiments, systems and methods for quantum-based network traffic anomaly detection are disclosed. Embodiments for a network integrity monitor are disclosed that leverage a quantum computing-based network assessment function to evaluate network event data for the purposes of identifying and/or predicting anomalies indicative of network threats. To identify network anomalies, the network assessment function may treat the anomaly identification as a quantum search task by searching the task data using an amplitude amplification quantum search algorithm and/or using quantum machine learning models to infer a threat prediction that may include a single or multiclass classification characterizing the task data. Such classification(s) may be further assessed by the network integrity monitor as the basis to trigger one or more mitigating steps.

20 Claims, 11 Drawing Sheets

(56) References Cited

U.S. PATENT DOCUMENTS 12,273,837 B2 * 4/2025 Paczkowski ........ H04W 56/004

OTHER PUBLICATIONS

"D-Wave Systems | The Practical Quantum Computing Company", unlock the power of practical quantum computing today, Retrieved from Internet URL: https://www.dwavesys.com/, accessed on Sep. 5, 2023, 5 pages.

Tychola, K.A., et al., "Quantum Machine Learning—An Overview", Electronics 2023, vol. 12, Retrieved from Internet URL: https://doi.org/10.3390/electronics12112379, 22 pages (May 24, 2023).

Kumar, A., "Quantum machine learning: Concepts and Examples", Data Analytics, Retrieved from Internet URL: https://vitalflux.com/quantum-machine-learning-concepts-and-examples/, accessed on Sep. 8, 2023, 8 pages (Sep. 25, 2021).

Nawaz, S. J., et al., "Quantum Machine Learning for 6G Communication Networks: State-of-the-Art and Vision for the Future", IEEE Access, vol. 7, pp. 46317-46350 (Apr. 4, 2019).

* cited by examiner

SYSTEMS AND METHODS FOR QUANTUM-BASED NETWORK TRAFFIC ANOMALY DETECTION

BACKGROUND

The operations and security of wireless telecommunications networks are continuously challenged by a wide spectrum of potential threats, which can include threats that are naturally occurring and threats caused by malicious human behavior. During the course of a single day, a telecommunications network operator may collect data on billions of individual events that each may represent some level of threat to network performance and security. Threats and their precursors can often be identified by identifying anomalies in network activity. However, comprehensive monitoring of network events to identify such anomalies is challenging given the volume of data that needs to be quickly evaluated in order to be able to address threats in real-time.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure provide for a network integrity monitor that leverages a quantum computing-based network assessment function to evaluate network event data for the purposes of identifying and/or predicting anomalies indicative of network threats. The embodiments described herein realize a network assessment function that is executed on a quantum computing platform and inputs a set of data representing network events (event data) generated by a variety of network monitoring functions. The event data may be stored as network integrity data that is accessed by a network integrity monitor. The network integrity monitor may select from the network integrity data a subset of the network integrity data that is evaluated by the quantum computing-based network assessment function. To identify network anomalies, the network assessment function may treat the anomaly identification as a quantum search problem or task by searching the task data (e.g., the selected subset of the network integrity data) using an amplitude amplification quantum search algorithm (such as Grover's Algorithm, for example) and/or one or more quantum machine learning (QML) models to infer a threat prediction that may include a single or multiclass classification characterizing the task data. The results produced by the quantum-based network assessment function may be used to form a threat profile that characterizes and/or classifies occurring and/or emerging threats to the operation and/or security of the network. Such classification(s) may be further assessed by the network integrity monitor as the basis to trigger the one or more mitigating steps.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
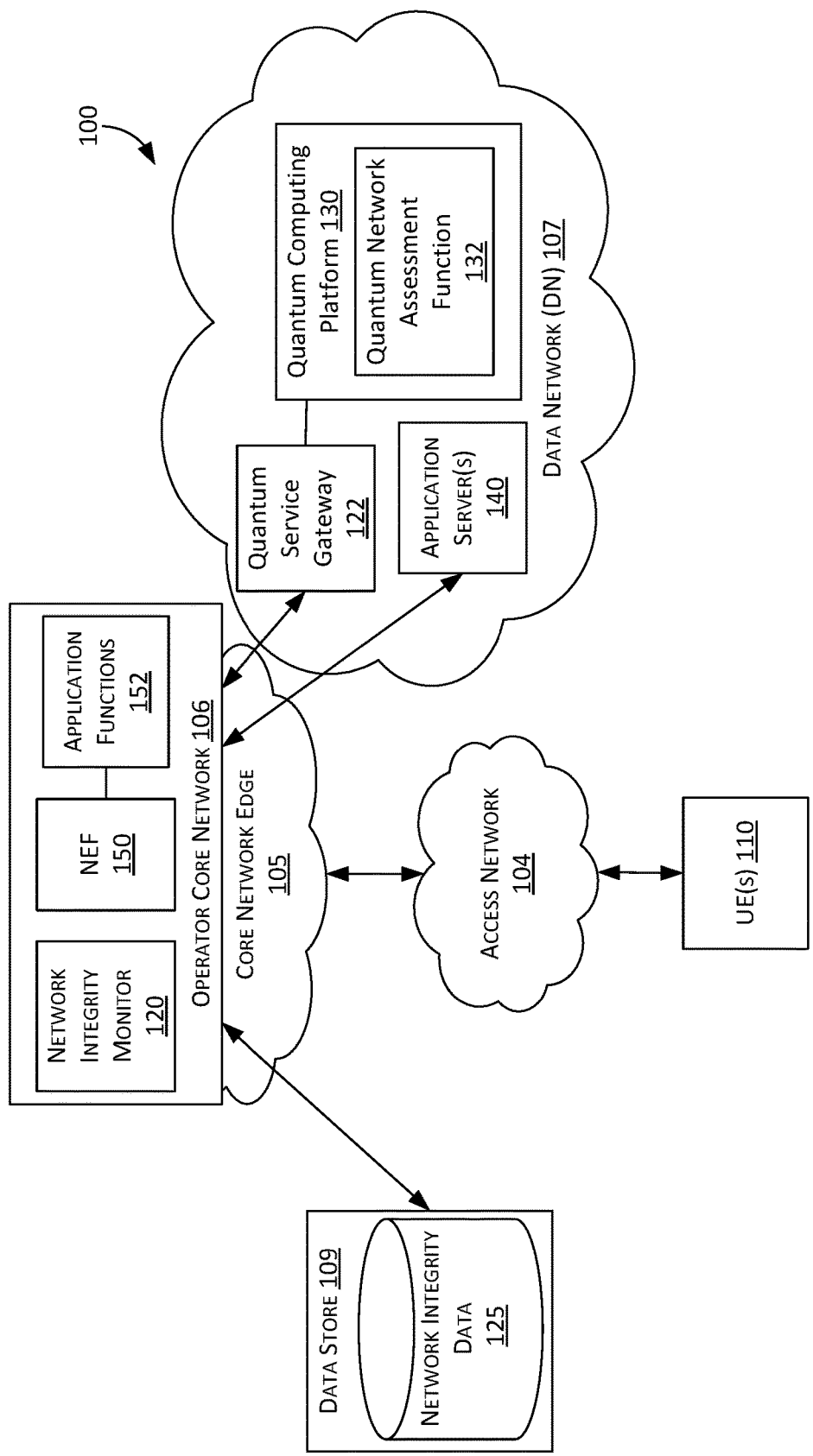
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

Embodiments of the present disclosure provide for a network integrity monitor that leverages a quantum computing-based network assessment function to evaluate network event data for the purposes of identifying and/or predicting anomalies indicative of network threats. As discussed herein, network integrity encompasses both network performance and network security. Network integrity is high when the network is functioning without threats to performance (e.g., not degraded with respect to availability, bandwidth, latency, or other operational parameters) and not compromised due to security threats. Comprehensive monitoring of network events to identify threats within the context of a telecommunications network is challenging given the volume of event data that needs to be quickly evaluated in order to be able to address threats in real-time. Threats such as, but not limited to, denial of service attacks, phishing attacks, ransomware attacks, unauthorized resource access, weather and/or environmental event (e.g., network infrastructure degradation and/or damage from heat and/or storms) can negatively affect network reliability and availability, ultimately causing potential connectivity outages to subscribers of network services. Network monitoring systems today may rely on human operators and/or detection algorithms that may be adequate for detecting malicious activity and network anomalies that have progressed to the point where suspicious traffic patterns and/or authentication and access attempts reach a threshold. That said, with respect to telecommunications networks, there is an immense number of distinct devices operating on the network creating a corresponding volume of traffic-whether smart phones, tablets, computers, smart appliances, Internet-of-Things (IoT) devices, and/or other network-connected devices—with that number boundlessly increasing. As a result, the volume of event data that needs to be quickly evaluated in order to be able to address real-time threats can be expected to exceed the processing abilities of traditional methods to identify patterns or signatures of threatening anomalous events and address them in time to mitigate and/or minimize damage (e.g., network service disruptions).

Embodiments of the present disclosure, among other things, provide for a network integrity monitor that leverages a quantum computing-based network assessment function to evaluate network event data for the purposes of identifying and/or predicting anomalies indicative of network threats. The embodiments described herein realize a network assessment function that is executed on a quantum computing platform and inputs a set of data representing network events (network event data) generated by a variety of network monitoring functions. In some embodiments, the network events include network performance metric measurements, such as, but not limited to, data traffic flow rates, core network traffic patterns, data traffic latencies and/or jitter, network infrastructure equipment status, dropped packets, suspicious network resource access attempts, and the like. The network event data may include sensor measurements and/or environmental data, such as, but not limited to, temperatures, humidity, barometric pressures, seismic sensor data, and/or data received from an external reporting source such as from a weather monitoring agency.

Corresponding anomalies identifiable from such network event data may include, but is not limited to, a sudden spike in network traffic in one or more channels, rising communication traffic between network functions of the operator core network and/or core network edge, anomalous outbound connections from elements of the operator core network and/or core network edge to elements external to the network. For example, anomalous network event data may include a sudden or uncharacteristic increase in network traffic from a specific network address or a range of network addresses and/or a sudden or uncharacteristic increase in network traffic, targeting a destination network address or a range of network addresses. Such a sudden change in the pattern of the network traffic from nominal traffic patterns may be indicative of a network intrusion, a denial of service attack, a malware infection (e.g., activation of a rough botnet or a worm). Anomalous network event data may also include data that capture occurring and/or emerging environmental events (e.g., storms, heatwaves, and earthquakes) that can potentially cause network degradations, as well as data indicative of network equipment faults.

In some embodiments, the event data may be stored (e.g., in a data store) as network integrity data that is accessed by a network integrity monitor. The network integrity monitor may be implemented as a network function of the operator core network and/or of the core network edge. The network integrity monitor may select from the network integrity data a subset of the network integrity data (e.g., a subset based on a specified partition of the network and/or specified time slice). The selected network integrity data subset may be used to define task data upon which the quantum computing-based network assessment function operates to determine, within a prescribed degree of confidence, the possibility that one or more anomalies indicative of network threats may be present in the evaluated event data. If anomalies corresponding to threats are identified by the network assessment function, then one or more mitigating steps can be triggered (e.g., generating an alarm, locking or disabling accounts, reconfiguring access to network resources, reconfiguring network infrastructure equipment, switching traffic patterns, and/or initiating other response processes).

To identify network anomalies, the network assessment function may treat the anomaly identification as a quantum search problem or task by searching the task data (e.g., the selected subset of the network integrity data) using an amplitude amplification quantum search algorithm (such as Grover's Algorithm, for example). Quantum search algorithms are designed to search through vast amounts of data, much faster than achievable through classical algorithms, by leveraging quantum properties, such as superposition and entanglement, to perform searches efficiently. The network assessment function may execute one or more quantum machine learning (QML) models to infer a threat prediction that may include a single or multiclass classification characterizing the task data. Such classification(s) may be further assessed by the network integrity monitor as the basis to trigger the one or more mitigating steps. Training of the quantum machine learning model(s) may involve, for example, a supervised training process where labeled ground truth event data is fed as training data to the machine learning model, and the quantum machine learning model(s) is adjusted based on the accuracy of inferences predicted from the training data. For example, in some embodiments, labeled ground truth event data representing event data collected from actual threat events, or synthesized based on event data collected from actual threat events, may be applied as training data to the machine learning model. The machine learning model may then predict a threat classification based on the training and adjusted based on whether the prediction accurately classified the threat represented by the training data. Quantum deep neural networks (QDNNs) are one example of a quantum machine learning technology. QDNNs can leverage quantum structured layers to perform complex machine learning tasks, including solving classification problems by training the neural network using labeled sets of training data (often referred to as quantum classification). QDNNs can also leverage the quantum properties of superposition and entanglement to process data.

In some embodiments, a network operator may specify the degree of confidence desired from the network assessment function, and the network assessment function may perform repeated iterations on the quantum basis states based on the desired degree of confidence, converging on a more accurate prediction with each iteration. In some embodiments, amplitudes of basis states that correspond to deviations from nominal network conditions and/or traffic patterns will increase in amplitude at each iteration performed by the quantum search algorithm. Amplitudes of basis states that do not show deviations from the nominal network conditions and/or traffic patterns may be defined as non-solutions to the search problem and will decrease in amplitude each iteration. In some embodiments, an output from the search algorithm may be used as an input to a quantum machine learning model that infers one or more predictions regarding the state of the network, such as, for example, classifications of potential network threats that may be emerging based on the search results. In some embodiments, the quantum machine learning model may input the output from the search algorithm together with the task data to infer the predictions. In still other embodiments, a quantum machine learning model may infer classifications derived from the task data, and use those classification to adjust task functions that drive the quantum search algorithm to better focus and/or increase efficiency of the search task of identifying anomalies from the task data. The results produced by the quantum-based network assessment function may be used as the basis to form a threat profile that characterizes occurring and/or emerging threats to the operation and/or security of the network.

In some embodiments, the network assessment function may be accessed by the network integrity monitor as service exposed by a network exposure function (NEF) of the operator core network and/or otherwise accessible through at least one application programming interface (API). For example, one or more application functions exposed through the NEF may comprise at least one API through which the network integrity monitor can call on the services and/or resources of a quantum computing platform hosting the network assessment function, and/or of other quantum algorithms. That is, the network assessment function can be made accessible through an operator's core network and exposed through one or more APIs. The network integrity monitor can utilize these APIs to interact with the network assessment function, which may be hosted on a quantum computing platform or another platform. The network integrity monitor thus is able to leverage the power of quantum computing and other quantum algorithms to assess and enhance network security and performance. As an example, the network integrity monitor can access the network assessment function through an exposed API to assess network latency. For this example, the NEF may invoke the quantum computing platform to perform complex calculations and quantum based measurements to provide accurate latency data back to the network integrity monitor, and/or identify anomalous latency events. As another example, the network integrity monitor can access the quantum-based network assessment function through an exposed API to perform a security assessment. The network integrity monitor is attempting to identify potential network vulnerabilities. As such, network integrity monitor may utilize an API of the NEF API to access a network assessment function that employs quantum algorithms for security assessment by analyzing network security data to generate information for vulnerability reports. The network integrity monitor may receive real-time updates from the network assessment function which may include recommendations to improve network security.

Throughout the description provided herein, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense meaning in the telecommunication arts as one skilled in the art would readily comprehend. Further, various technical terms are used throughout this description. An illustrative resource that fleshes out various aspects of these terms can be found in *Newton's Telecom Dictionary*, 31st Edition (2018).

The subject matter described herein is generally described in the context of a wireless communications network. This is done merely for the sake of clarity, and those skilled in the art may, upon reading this description, understand other contexts in which the subject matter may be utilized. For example, the quantum computing-based quantum network assessment function embodiments described herein may be implemented in the context of other networks, such as but not limited to, data centers, commercial and business networks, infrastructure networks (such as an A/C power grid), economic and/or financial networks (such as high-frequency trading, flash trading, and generalized electronic trading), air traffic control networks, first responder networks (such as emergency medical services (EMS), police, fire rescue, and the like), amongst others. Again, however, even these examples are not provided to limit the scope of this description.

FIG. 1 is a diagram illustrating an example network environment 100 embodiment. Network environment 100 is but one example of a suitable network environment for use in implementing embodiments of the present disclosure and is not intended to suggest any limitation as to the scope of use or functionality of the embodiments disclosed herein, and nor should the network environment be interpreted as having any dependency or requirement relating to any one or combination of components illustrated.

As shown in FIG. 1, network environment 100 comprises an operator core network 106 (also referred to as a "core network") that provides one or more network services to one or more user equipment (UEs) 110 via at least one access network 104. In some embodiments, network environment 100 comprises, at least in part, a wireless communications network.

In some embodiments, the access network 104 comprises one or more radio access networks (RANs). A RAN is often referred to as a base station, cell site, or cellular base station. The RAN may implement wireless connectivity using, for example, 3GPP technologies. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intranet comprising one or more wireless access points (WAPs) such as, but not limited to, IEEE 802.11 (WiFi), and/or IEEE 802.15 (Bluetooth) access points.

The access network 104 may comprise a multimodal network (for example, comprising one or more multimodal access devices) where multiple radios supporting different systems are integrated into the access network 104. Such a multimodal access network 104 may support a combination of 3GPP radio technologies (e.g., 4G, 5G, and/or 6G) and/or non-3GPP radio technologies. In some embodiments, the access network 104 may comprise a terrestrial wireless communications base station and/or may be at least in part implemented as a space-based access network (e.g., comprising a space-based wireless communications base station).

In particular, individual UE 110 may communicate with the operator core network 106 via the access network 104 over one or both of uplink (UL) radio frequency (RF) signals and downlink (DL) radio frequency (RF) signals and/or via wired network connections. The access network 104 may be coupled to the operator core network 106 via a core network edge 105 that comprises wired and/or wireless network connections that may themselves include wireless relays and/or repeaters. In some embodiments, the access network 104 is coupled to the operator core network 106 at least in part by a backhaul network, such as the internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to, access network 104, the internet, or other third-party networks.

It should be understood that in some aspects, the network environment 100 may not comprise a distinct operator core network 106, but rather may implement one or more features of the operator core network 106 within other portions of the network, or may not implement them at all, depending on various carrier preferences. Moreover, the embodiments described herein may be implemented within the context of other networks besides telecommunications networks. That is, using cloud-based cookies and a corresponding cookie ledger as described herein, in some embodiments, may be implemented within a corporate and/or enterprise intranet, local area network, data center, and/or wide area network (WAN). Network environment 100 may also comprise, or otherwise be coupled to, at least one data network (DN) 107 coupled to the operator core network 106 (e.g., via the network edge 105). In some embodiments, UE 110 may access services and/or content provided by one or more cloud-based services hosted by one or more application servers 140 of DN 107.

Generally, an individual UE 110 may comprise a device capable of unidirectional or bidirectional communication with the access network 104 via wireless and/or wired communication links. The network environment 100 may be configured for wirelessly connecting UEs 110 to other UEs 110 via the same access network 104, via other access networks, via other telecommunications networks, and/or to connect UEs to a public switched telecommunication network (PSTN). The network environment 100 may be generally configured for wirelessly connecting a UE 110 to data or services that may be accessible on one or more application servers or other functions, nodes, or servers. The network environment 100 may be generally configured, in some embodiments, for wirelessly connecting UE 110 to data or services that may be accessible on one or more application servers or other functions, nodes, or servers (such as by servers 140 of data network 107).

UE 110 are in general forms of equipment and machines such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the UE 110 may include both mobile UE and stationary UE. Moreover, UE 110 may comprise 3GPP and non-3GPP devices. A UE 110 can include one or more processors and one or more non-transient computer-readable media for executing code to carry out the functions of the UE 110 described. The computer-readable media may include computer-readable instructions executable by the one or more processors. In some embodiments, the UE 110 may be implemented using a computing device 700, as discussed below with respect to FIG. 7.

In aspects, each access network 104 may comprise a RAN that is installed at a fixed location, such as a communication tower. The communication tower may be a structure designed to support one or more antennas for communications and/or broadcasting. In other embodiments, access network 104 comprises a mobile base station, small cell, mini cell, microcell, picocell, and/or a femtocell. In this way, access network 104 can facilitate wireless communications between UE 110 and other devices. The access network 104 may include at least one baseband unit (BBU) responsible for, among other things, digital baseband signal processing. For instance, CDMA/EVDO and LTE Internet protocol (IP) packets are received from a wireless communications network and are digitally combined by the BBU at the access network 104. The blended digital baseband signal is transmitted to a radio at the access network 104. Digital baseband signals received from the radio are demodulated by the BBU, and the resulting IP packets are transmitted by the BBU to the operator core network 106. The access network 104 may include a radio (not shown) or a remote radio head (RRH) that generally communicates with one or more antennas associated with the access network 104. The access network 104 may support multiple-input multiple-output (MIMO) and/or time division duplex or any other suitable communication protocols. Notably, the preceding nomenclature is used with respect to 3GPP 4G and 5G architectures. In other aspects, each of the preceding functions and/or modules may take different forms, including consolidated or distributed forms that perform the same general operations.

As discussed above, the network environment 100 may comprise a network integrity monitor 120 that works in conjunction with a quantum network assessment function 132 to evaluate network event data for the purposes of identifying and/or predicting anomalies indicative of network threats. Event data may include information characterizing various measurements and/or network event occurrences. As non-limiting examples, event data may include: data regarding network performance metric measurements, such as, but not limited to, data traffic flow rates, core network traffic patterns, data traffic latencies and/or jitter, network infrastructure equipment status, dropped packets, suspicious network resource access attempts, and the like; sensor measurements and/or environmental data, such as, but not limited to, temperatures, humidity, barometric pressures, and seismic sensor data; and/or data received from an external reporting source, such as from a weather monitoring agency, for example. In some embodiments, such event data may be collected, computed, and/or derived by one or more network functions of the operator core network 106 and/or core network edge 105. In some embodiments, the event data may be stored in a data store 109 as network integrity data 125 that is accessed by the network integrity monitor 120. In some embodiments, the network integrity monitor 120 may be implemented as a standalone network function of the operator core network 106. In some embodiments, the network integrity monitor 120 may be integrated into other network functions of the operator core network 106.

The network integrity monitor 120 may be implemented as a network function of the operator core network 106 and/or of the core network edge 105. To perform a network threat analysis, the network integrity monitor 120 may select a subset of the network integrity data 125 for evaluation by the quantum network assessment function 132. The subset of the network integrity data 125 provided to the quantum network assessment function 132 may comprise a corpus of task data upon which the quantum network assessment function 132 is applied to infer and/or predict network events. In some embodiments, the quantum network assessment function 132 is provided a subset of the network integrity data 125 that corresponds to event data relevant to a particular network segment, partition, domain, or slice of the network environment 100. In some embodiments, the quantum network assessment function 132 is provided a subset of the network integrity data 125 that corresponds to a specified window or slice of time (e.g., the most recently collected 5, 10, or 60 minutes of time, or duration selected to assess network patterns that may have been associated with known past threats). The selected task data may then be processed by the quantum computing-based network assessment function 132 to determine, within a prescribed degree of confidence, the possibility that one or more anomalies indicative of network threats may be present in the evaluated data.

As discussed in greater detail herein, the quantum network assessment function 132 may be executed on a quantum computing platform 130 that comprises one or more quantum processors, one or more classical processors, and/or a hybrid quantum-classical computing platform comprising a combination thereof, programmed to execute quantum computing algorithms. The quantum network assessment function 132 may comprise a specialized function executed within the within quantum computing platform 130 designed for evaluating and/or analyzing a network (e.g., a telecommunications network, an enterprise network and/or a quantum network) to assessing various aspects of the network's performance and security. As discussed below with respect to FIG. 3, the quantum computing platform 130 may comprises a hybrid quantum-classical computing platform that includes a combination of one or more quantum processing units 305 and/or one or more classical computing processing unit(s) 306 (e.g., one or more central processing units (CPUs), graphics processing units (GPUs), or similar classical processors) programmed to emulate quantum processes and execute algorithms having quantum elements (e.g., such as but not limited to Quantum Key Distribution (QKD) and/or a Quantum Random Number Generator (QRNG)). In some embodiments, the quantum network assessment function 132 may comprise a combination of classical computing and quantum computing elements (e.g., a hybrid classical-quantum algorithm) that are executed by respective classical and quantum computing processing resources of the quantum computing platform 130. In some embodiments, one or more quantum computing elements of the quantum network assessment function 132 may be performed using classical processing resources executing the quantum computing element using quantum simulation and/or emulation technologies. Example quantum algorithms that quantum computing platform 130 may execute include one or more of, but are not limited to, Shor's algorithm (e.g., for computing prime factors of an integer and/or solving the discrete logarithm problem), Grover's Algorithm (e.g., for searching an unstructured database and/or an unordered list), and/or Quantum-Resistant Cryptographic Algorithms (e.g., the CRYSTALS-Kyber algorithm for general encryption and the CRYSTALS-Dilithium, FALCON, and SPHINCS+ algorithms for digital signatures). In some embodiments, the quantum network assessment function 132 may operate in multi-mode (e.g. executing hybrid types of algorithms for high confidential applications) in order to implement combinations of security and/or encryption algorithms that are more secure than individual algorithms in single-mode.

In some embodiments, the quantum computing platform 130 may be accessible as a node or service from the data network 107. For example, in some embodiments the quantum computing platform 130 may offer hybrid quantum computing instances as a service, wherein the quantum network assessment function 132 is hosted within a context of such a service. In some embodiments, a quantum service gateway 122 may function as an interface between the network integrity monitor 120 and the quantum computing platform 130 (e.g., via a public network, such as but not limited to the Internet).

In some embodiments, the quantum network assessment function 132 may be accessed by the network integrity monitor 120 as service exposed by a network exposure function (NEF) 150 of the operator core network 106 and/or otherwise accessible through at least one application programming interface (API). For example, one or more application functions 152 exposed through the NEF 150 may comprise at least one API through which the network integrity monitor 120 (and/or other network function) can call on the services and/or resources of a quantum computing platform 130 hosting the network assessment function 132. In some embodiments, access to the resources of the quantum computing platform 130 and/or the quantum network assessment function 132 may be managed as a microservice subscription by the operator core network 106.

The network integrity monitor 120 may be controlled from a management node to select what set(s) of network event data are applied to the quantum network assessment function 132, or that selection of event data may be automatically controlled based on a policy or predetermined criteria. Each instance of event data passed to the quantum network assessment function 132 may represent at least in part an instance of task data that corresponds to a quantum basis state evaluated by the quantum network assessment function 132, where each basis state may be expressed as a probability amplitude comprising a complex number.

To identify network anomalies and infer network threat predictions, the network assessment function 132 may treat the anomaly identification as a quantum search problem or task by searching the task data selected by the network integrity monitor 120 using an amplitude amplification quantum search algorithm (such as Grover's Algorithm, for example) and/or one or more quantum machine learning (QML) models to infer a threat prediction that may include a single or multiclass classification characterizing the task data. Such classification(s) may be further assessed by the network integrity monitor 120 as the basis to trigger the one or more mitigating steps.

Figure 2:
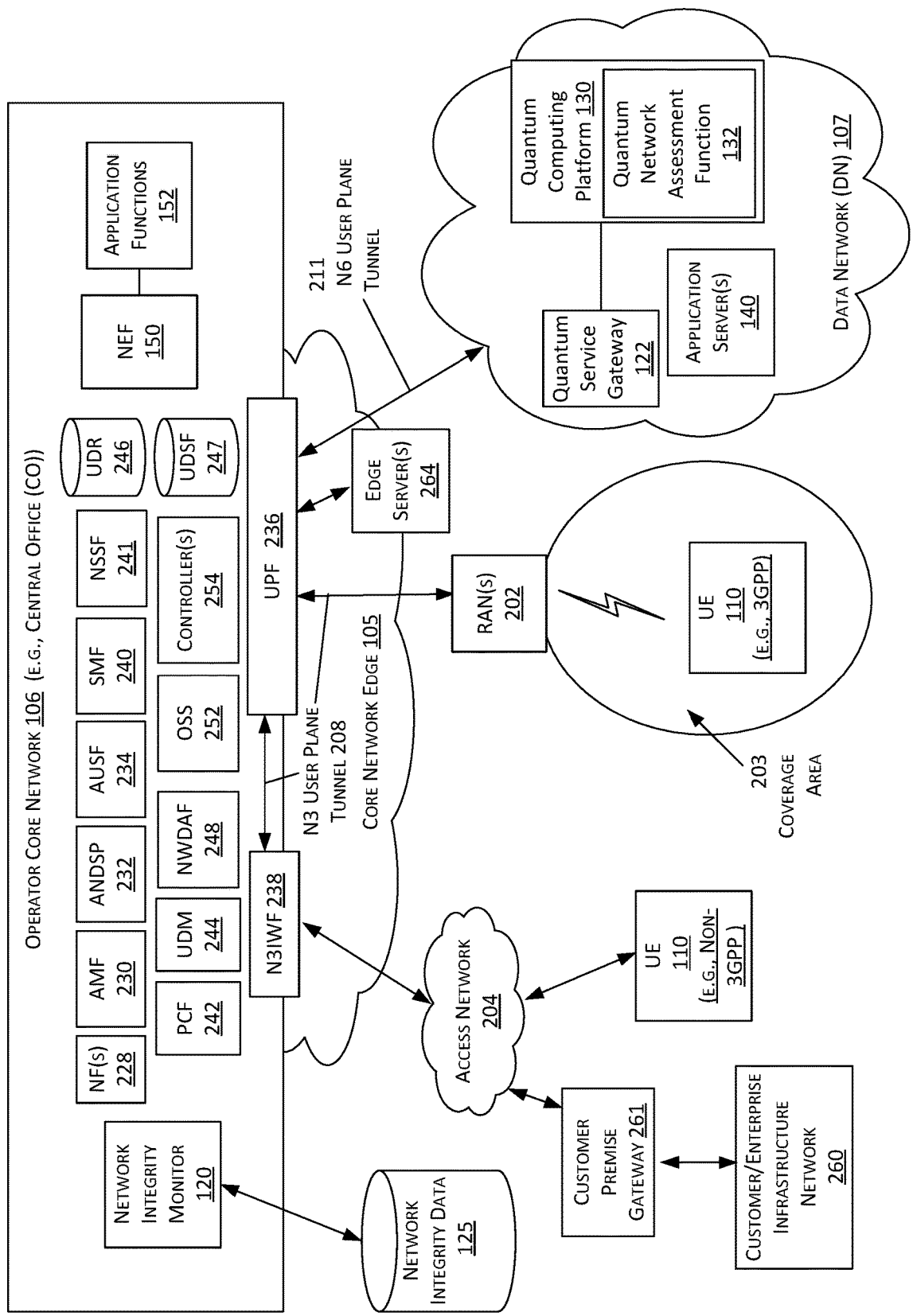
FIG. 2 is a diagram illustrating an example implementation of a telecommunications network environment, in accordance with some embodiments described herein.

FIG. 2 is a diagram illustrating an example implementation of network environment 100 in accordance with one or more embodiments. In some embodiments, the access network 104 comprises one or more radio access networks (RANs) 202. Each RAN 202 may provide wireless connectivity access to one or more UEs 110 operating within a coverage area 203 associated with that RAN 202. The RAN 202 may be referred to as a base station, cell site, or cellular base station. The RAN 202 may implement wireless connectivity using, for example, 3GPP technologies. The RAN 202 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 202 may comprise, at least in part, components of a customer premises network, such as a distributed antenna system (DAS), for example.

The access network 204 may comprise a non-3GPP customer premises network, such as a local area network or intranet. The access network 204 may provide wired and/or wireless access to one or more elements of a customer infrastructure network 260 (e.g., an enterprise infrastructure network) via a customer premise gateway 261. The access network 204 may provide access to one or more non-3GPP UEs 110 via wired connections and/or wireless access points (WAPs) such as, but not limited to, IEEE 802.11 (WiFi) and/or IEEE 802.15 (Bluetooth) access points. Note that in some embodiments, a UE 110 may have functionality to selectively operate as a 3GPP UE or a non-3GPP UE.

One or both of radio access network 202 and/or access network 204 may comprise a multimodal network (for example, comprising one or more multimodal access devices) where multiple radios supporting different systems are integrated into the networks 202 and 204. Such a multimodal access network may support a combination of 3GPP radio technologies (e.g., 4G, 5G, and/or 6G) and/or non-3GPP radio technologies. In some embodiments, the radio access network 202 may comprise a terrestrial wireless communications base station and/or may be at least in part implemented as a space-based access network, such as a base station implemented by an Earth-orbiting satellite.

In some embodiments, the network edge 105 may comprise one or more network nodes that include edge server(s) 264. Edge server(s) 264 may provide, for example, edge-based services to UE 110 that may be accessed separately from services provided by network functions of the operator core network 106. For example, edge server(s) 264 may host databases, caches, microservices, ledgers, decentralized applications (e.g., DApps), and/or may perform data traffic monitoring, inspections, and/or aggregation for other network functions of the network environment 100.

In some implementations, the operator core network 106 may comprise modules, also referred to as network functions (NFs), generally represented in FIG. 2 as NF(s) 228. Such network functions may include, but are not limited to, one or more of a core access and mobility management function (AMF) 230, an authentication server function (AUSF) 234, a user plane function (UPF) 236, non-3GPP interworking function (N3IWF) 238, a session management function (SMF) 240, a network slice selection function (NSSF) 241, a policy control function (PCF) 242, unified data management (UDM) 244, a unified data repository (UDR) 246, an unstructured data storage function (UDSF) 247, a network data analytics function (NWDAF) 248, a network exposure function (NEF) 150, and an operations support system (OSS) 252. The operator core network 106 may also comprise an access network discovery and selection policy (ANDSP) 232, discussed below. In some embodiments, an operator core network 106 may include a business support system (BSS) that may be used for provisioning and activating 5G services for subscribers—including allocating network resources, setting up user profiles, and/or ensuring proper service configuration. Implementation of these or other NFs and/or policies of the operator core network 106 may be executed by one or more controllers 254 on which these network functions are orchestrated or otherwise configured to execute utilizing processors and memory of the one or more controllers 254. The NFs may be implemented as physical and/or virtual network functions, container network functions, and/or cloud-native network functions, such as is described with respect to FIG. 8. Within the context of network slices created by the operator core network 106, the operator core network 106 may orchestrate individual dedicated instances of one or more of the network functions described herein to establish and support operation of a network slice.

Notably, the nomenclature used herein is used primarily with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management. In other forms, such as a 4G architecture, the AMF 230 of FIG. 1 may take the form of a mobility management entity (MME). The operator core network 106 may be generally said to authorize rights to and facilitate access to an application server/service, such as provided by application function(s) 152 requested by one or more UEs, such as UE 110. In some embodiments, the NSSF 241 works in conjunction with the AMF 230 to establish network slice instances, such as is described herein.

As shown in FIG. 1, UPF 236 represents at least one function of the operator core network 106 that may extend into the core network edge 105. In some embodiments, the RAN 202 is coupled to the UPF 236 within the core network edge 105 by a communication link that includes an N3 user plane tunnel 208. For example, the N3 user plane tunnel 208 may connect a cell site router of the RAN 202 to an N3 interface of the UPF 236. The data store 109 may be coupled to the UPF 236 in the core network edge 105 by an N6 user plane tunnel 211. For example, the N6 user plane tunnel 211 may connect a network interface (e.g., a switch, router, and/or gateway) of the DN 107 to an N6 interface of the UPF 236. In some embodiments, the operator core network 106 may comprise a plurality of UPFs 236, such as a UPF at the operator core network 106 and a UPF at the core network edge 105. For example, a UPF at the core network edge 105 may be used for local breakout and/or low-latency types of application via an N9 interface between the two UPFs.

The AMF 230 facilitates mobility management, registration management, and connection management for 3GPP devices, such as a UE 110. ANDSP 232 facilitates mobility management, registration management, and connection management for non-3GPP devices. As a policy, the ANDSP 232 may comprise a data structure containing policy information that may be is used to control the UE behavior related to access network discovery and selection over non-3GPP access network, and may be provisioned by the PCF 242. While the AMF 230 is the network function that manages the mobility and registration, the ANDSP 232 can be used (in precedence) by UE when selecting which network they should connect to. AUSF 234 may receive authentication requests from the AMF 230 and interacts with UDM 244, for example, for SIM authentication and/or to authenticate a UE 110 based on a generated device identification (ID). N3IWF 238 provides a secure gateway for non-3GPP network access, which may be used for providing connections for UE 110 access to the operator core network 106 over a non-3GPP access network (e.g., access network 204). For example, a data link may be established between the customer premise gateway 261 and the N3IWF 238 via the access network 204.

SMF module 240 facilitates initial creation of protocol data unit (PDU) sessions using session establishment procedures. The PCF 242 maintains and applies policy control decisions and subscription information. Additionally, in some aspects, the PCF 242 maintains quality of service (QOS) policy rules. For example, the QoS rules stored in a unified data repository (UDR) 246 can identify a set of access permissions, resource allocations, or any other QoS policy established by an operator. The Unstructured Data Storage Function (UDSF) 247 may store dynamic state data, which is structured and unstructured data related to network function of the operator core network 106. That is, the UDSF 247 may support storage and retrieval of structured and/or unstructured data by other network functions 228 of the operator core network 106, including information relating to access control and service and/or microservice subscriptions (e.g., a microservice subscription associated with using resources of the quantum computing platform 130).

In some embodiments, the PCF 242 maintains subscription information indicating one or more services and/or microservices subscribed to by each UE 110. In some embodiments, a PCF 242 may maintain subscription information pertaining to UE 110 or other network functions authorized to access services from the quantum computing platform 130 via quantum service gateway 122. The UDM 244 manages network user data including, but not limited to, data storage management, subscription management, policy control, and operator core network 106 exposure. NWDAF 248 may collect data (for example, from UE; other network functions; application functions; and operations, administration, and maintenance (OAM) systems) that can be used for network data analytics and/or can be used as event data saved to the network integrity data 125 and accessible to the network integrity monitor 120. The OSS 252 is responsible for the management and orchestration of the operator core network 106 and the various physical, virtual network functions, container network functions, controllers, computer nodes, and other elements that implement the operator core network 106.

Some aspects of network environment 100 include the UDR 246 storing information relating to access control and service and/or microservice subscriptions. The UDR 246 may be configured to store information relating to such subscriber information and may be accessible by multiple different network functions (NFs) 228 in order to perform desirable functions. For example, the UDR 246 may be accessed by the AMF 230 in order to determine subscriber information pertaining to the UE 110, accessed by a PCF 242 to obtain policy-related data, or accessed by NEF 150 to obtain data that is permitted for exposure to third-party applications (such as applications executed by UE 110, for example). Other functions of the NEF 150 include monitoring of UE-related events and posting information about those events for use by external entities, and providing an interface for provisioning UEs (via PCF 242) and reporting provisioning events to the UDR 246. Although depicted as a unified data management module, UDR 246 can be implemented as a plurality of network function specific data management modules. As mentioned above, in the context of a network slice, the operator core network 106 may orchestrate individual instances of each of these network functions and other such network functions described herein that are dedicated to the network slice.

The UPF 236 is generally configured to facilitate user plane operation relating to packet routing and forwarding, interconnection to a data network (e.g., DN 107), policy enforcement, and data buffering, among other operations. Using network slicing (e.g., based on 5G software-defined networking managed by the 5G network slice selection function (NSSF) 241), the UPF 236 may establish a dedicated slice network for one or more data channels between various network functions and other entities that act as, in essence, a distinct network (for example, establishing its own QoS, provisioning, and/or security) within the same physical network architecture of network environment 100. A network slice type may be used to identify service characteristics of a network slice, and at least in part may define the configuration of the slice network functions that make up that network slice. For example, in different implementations, a UE 110 may be assigned a network slice such as an Enhanced Mobile Broadband (eMBB) network slice, a Massive Machine Type Communications (MMTC) network slice, an Ultra-Reliable Low-Latency Communication (URLLC) network slice, or a Public Safety (PS) network slice. A network slice instance, therefore, may comprise an instantiation of a specific network slice type.

The non-3GPP access network 204 may represent an untrusted network from the perspective of the operator core network 106, and the UEs 110 that access the access network 204 may represent untrusted UE 110. Accordingly, communication between the operator core network 106 and UE 110 connecting via the access network 204 may be established via the non-3GPP Interworking Function (N3IWF) 238. For example, in some embodiments, a UE 110 may authenticate with a WAP of the access network 204 to establish a wireless communications link with the access network 204. In some embodiments, a UE 110 may be coupled using a network cable to establish a wired network communication link with the access network 204. The non-3GPP access network 204 may be coupled to, and authenticated with, the N3IWF 238 of the operator core network 106. For example, an IPsec user plane tunnel and/or IPsec control plane tunnel may be created to establish a secure communication link between the UE 110 and the N3IWF 238. The N3IWF 238 may be coupled to the UPF 236 by a communication link that includes an N3 user plane tunnel 208.

Figure 3:
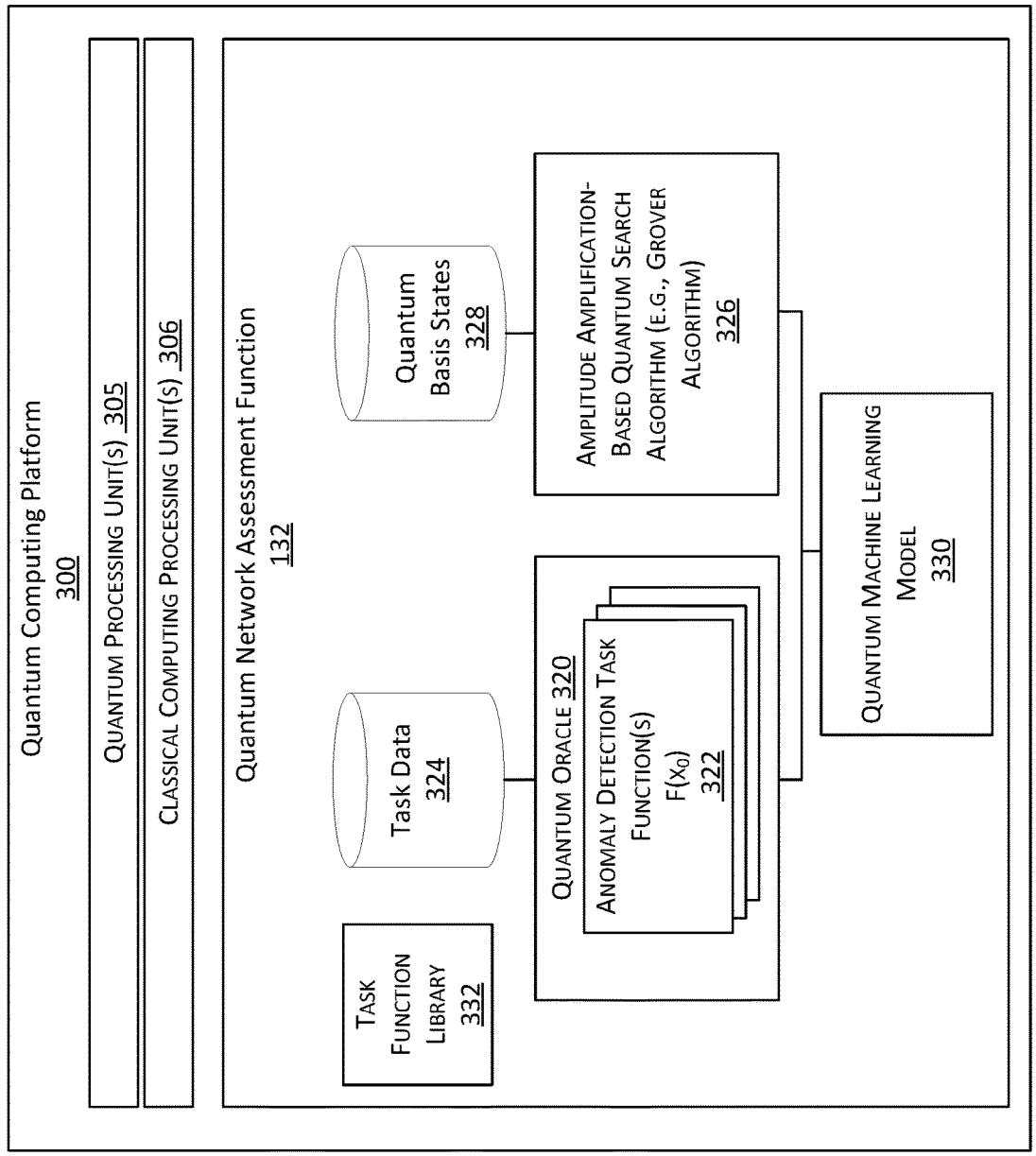
FIG. 3 is a diagram illustrating a quantum computing platform hosting a quantum network assessment function, in accordance with some embodiments described herein.

FIG. 3 is a diagram further illustrating a quantum computing platform 300 which may be used to implement the quantum computing platform 130 illustrated in FIG. 1 for executing the quantum network assessment function 132. The quantum computing platform 300 comprises a hybrid quantum-classical computing platform that includes a combination of one or more quantum processing units 305 and one or more classical computing processing unit(s) 306 (e.g., one or more central processing units (CPUs), graphics processing units (GPUs), or similar classical processors). In some embodiments, the quantum network assessment function 132 may comprise a combination of classical computing and quantum computing elements (e.g., a hybrid classical-quantum algorithm) that are executed by the respective classical computing processing unit(s) 306 and quantum processing unit(s) 305 of the quantum computing platform 130. In some embodiments, one or more quantum computing elements of the quantum network assessment function 132 may be performed using classical computing processing unit(s) 306 executing the quantum computing element(s) using quantum simulation and/or emulation technologies.

In this embodiment, the quantum computing platform 300 executes a quantum network assessment function 132 that comprises one or more of a quantum oracle 320, an amplitude amplification quantum search algorithm 326 (such as Grover's Algorithm, for example), and/or a quantum machine learning model 330. Grover's Algorithm is an example of an amplitude amplification quantum search algorithm for searching a database that may be used as amplitude amplification quantum search algorithm 326. Quantum deep neural networks (QDNNs) are one example of a quantum machine learning technology that can solve classification problems by training the neural network using labeled sets of training data (often referred to as quantum classification) that may be used as quantum machine learning model 330.

In some embodiments, the quantum network assessment function 132 executes the tasks of anomaly identification and threat prediction at least in part as quantum search task. In some embodiments, the subset of event data selected by the network integrity monitor are received by the quantum network assessment function 132 and stored as the task data 324. The task data 324 effectively serves as the database that is searched for network event anomalies by the quantum network assessment function 132. As explained below, the quantum network assessment function 132 searches the task data 324 to identify instances of event data that have characteristics inconsistent with nominal and/or expected network event patterns.

A distinguishing feature of quantum computing over traditional computing is the use of superposition to operate simultaneously on a set of quantum basis states 328 (e.g., a qubit state vector), where each basis state may be characterized by one or more amplitudes corresponding to a probability that an instance of event data stored in the task data 324 is anomalous versus non-anomalous (referred to herein as nominal). When the task data 324 is initially loaded, the quantum basis states 328 are initialized to have uniform superposition (e.g., equal amplitudes), since at that point no determinations have been made as to whether any of the items of task data 324 represent anomalous versus non-anomalous network events. With quantum computing, operations to identify the anomalous events from task data 324 can be performed by manipulating the quantum basis states 328 in substantially less time than a traditional computer would take to perform such a search. This allows the network integrity monitor 120 to perform threat assessment on the network environment 100 at a sufficient frequency to quickly predict and/or infer when a threat is emerging or occurring, and to react to such detections quickly enough to potentially minimize resulting degradation to the operations of operator core network 106, core network edge 105, access networks 104, UEs 110, and/or other network elements. The quantum-based solutions presented herein provide for a fast search, classification, and/or assessment of a large volume of task data so that near-real time responses to occurring and/or emerging threats can be initiated.

In general terms, a search task performed by the quantum network assessment function 132 can be expressed as a search task function f(x) that accepts as an input parameter the item "x." If the item x is a solution to the search task, then f(x)=1. Otherwise, if x is not a solution to the search task, then f(x)=0. For some embodiments, the search task performed by the quantum network assessment function 132 may be more specifically expressed by a representation of Grover's algorithm where for a given input, $f:\{0,1\}^n \rightarrow \{0,1\}$, f(x)=1 ∀ x=r||f(r)=1 and f(x)=0 ∀ x≠r, where r is the winning solution state. That is, the search is performed to find the value of "r" such that f(r)=1 and f(x)=0 for all x≠r. Each instance of event data within the task data 324 defines an item x which may potentially either be a solution or a non-solution to the search task function f(x). The quantum network assessment function 132 processes and evaluates one or more basis states of the quantum basis states 328 based on one or more search task functions f(x) implemented by the quantum oracle 320. In embodiments, each of the one or more search task functions f(x) may correspond to a particular class of anomaly that may be indicated by one or more instances of event data from the task data 324. The search task function f(x) is implemented by the quantum oracle 320 and applied by the amplitude amplification quantum search algorithm 326 to solve the search problem and interpret the results. As previously mentioned, an advantage of quantum computing is the ability for the quantum network assessment function 132 to perform calculations on individual inputs and on superposition of inputs to find the solutions to a search task function f(x). For example, the expression |NO>may be used to represent the superposition of all basis states 328 that are not a solution to the search task function f(x), whereas |YES>may be used to represent the superposition of all basis states 328 that are a solution to the search task function f(x).

As indicated in FIG. 3, in some embodiments, the quantum oracle 320 comprises one or more search task functions f(x), where an individual search task functions f(x) may be defined in terms of an anomaly detection task function f(x) 322. In some embodiments, an individual anomaly detection task function f(x) 322 may be programmed to search for a specific type of fault, threat, condition, or anomaly. For example, an individual anomaly detection task function f(x) 322 may be programmed to search for network event data indicating a high number of failed log-in attempts (e.g., higher than a threshold) targeting a specific network resource and/or coming from a common originating address or range of addresses. Anomaly detection task functions f(x) 322 may be considered specialized functions or processes designed to identify unusual or unexpected behavior within the network. A plurality of anomaly detection task functions f(x) 322 may be selected that holistically search for a range of faults, errors, threats, conditions, or anomalies, and/or other issues that together may form a pattern representative of a particular type of class of network threats. A search task function f(x) 322 may compute a prediction of a nominal characteristic of a parameter of network performance as would be indicated by event data absent the presence of an active threat/attack on the network. For example, a search task function f(x) 322 may estimate an expected nominal data traffic flow pattern (e.g., based on traffic volume) through one or more interfaces of a UPF 236. Such an estimate may be based on prior nominal traffic flow patterns and/or other baseline patterns or performance thresholds. Another search task function f(x) 322 may be configured to recognize a nominal number of a rate of instances of failed access attempts that typically occur for one or more network resources. Other search task functions f(x) 322 may be configured based on other nominal criteria that would represent expected levels of measurements and/or event occurrences represented by event data under nominal circumstances when the network is not under threat.

If a search task functions f(x) 322 search task is defined as the task of finding instances of event data not conforming to the nominal characteristic expectations of a search task functions f(x) 322, then event data consistent with the nominal characteristic (e.g., within a predefined tolerance) would be considered a non-solution to the search task (e.g., f(x)=0), whereas event data not consistent with the nominal characteristic (e.g., not within a predefined tolerance) would be considered a solution to the search task (e.g., f(r)=1) and identified as anomalous event data. In such an implementation, the amplitude amplification quantum search algorithm 326 is applied to search the task data 324 to identify the anomalous event data. If no instance of event data corresponds to a solution to a search task then the network segment, partition, and domain under assessment may be considered free of that particular class of anomaly for the searched time window.

Conversely, if the search task is defined as the task of finding those instances of event data that are conforming to the prediction, then event data corresponding to the nominal characteristic predicted by the search task functions f(x) 322 (e.g., within a predefined tolerance) would be considered a solution to the search task (e.g., f(r)=1), whereas instances of event data not having the nominal characteristic (e.g., not within a predefined tolerance) would be considered a non-solution to the search task (e.g., f(x)=0). In such an implementation, the amplitude amplification quantum search algorithm 326 is applied to search the task data 324 to identify those instances of event data that are in compliance with the nominal characteristics. Anomalous instances of event data may accordingly be determined based on identifying instances of event data not identified by the search task functions f(x) 322 as nominal.

In some embodiments, the quantum oracle 320 may include a plurality of task functions f(x) 322 that may be applied to the task data 324. The set of search results produced by the plurality of task functions f(x) 322 may be used to define a threat profile. In some embodiments, the search results may be clustered to further refine anomalous event data. A threat profile comprising one or more large clusters of anomalous event data (e.g., exceeding a threshold cluster size) and/or clusters of different threat types appearing as cluster patterns that correlate to known classes of network threats may be recognized by the quantum network assessment function 132 and/or the network integrity monitor 120 as evidence of an emerging or occurring network threat. For example, in some embodiments the network integrity monitor 120 may receive an initial threat profile that includes the results generated by the quantum network assessment function 132, then apply a clustering algorithm to cluster the results based on a selected criteria to produce a refined threat profile. In some embodiments, the quantum network assessment function 132 may include a clustering algorithm to cluster the results based on a selected criteria to produce a refined threat profile that it provides to the network integrity monitor 120. In some embodiments, the network integrity monitor 120 may correlate cluster patterns based on the threat profile with one or more predefined response profiles to trigger response protocols designed to counter or diminish negative effects on network operations—given the type of threat that produces the type of cluster pattern derived from the threat profile. The response protocols may include triggering mitigating steps to control network operations such as, but not limited to, generating an alarm, locking or disabling accounts, reconfiguring access to network resources, reconfiguring network infrastructure equipment, switching traffic patterns, rerouting network traffic, and/or initiating other response processes.

In some embodiments, the network integrity monitor 120 may select the specific task functions f(x) included within the plurality of task functions f(x) 322 that are applied to a given set of task data 324. For example, in some embodiments, the quantum network assessment function 132 may include a task function library 332 that includes a collection of predefined task functions that may be selected for inclusion with the plurality of task functions f(x) 322. In some embodiments, the plurality of task functions f(x) 322 may be tailored by the network integrity monitor 120 by selecting a set of task functions that search for commonly associated sets of network event anomalies. For example, a task function that searches for anomalous outbound data traffic volumes from a network resource may be paired with a task function that searches for high occurrences of network resource authorization failures, the combination of which may be indicative of a successful brute force attack on a network resource.

Because the quantum oracle 320 and search algorithm 326 are implemented at least in part as quantum functions, quantum network assessment function 132 can analyze all of the basis states 328 at one time. For various different embodiments, different algorithms may be used for the anomaly detection task functions f(x) 322 depending on the particular class of anomalous event data that is the target of the search class. For example, in some embodiments, the anomaly detection task function f(x) 322 may comprise a simple linear extrapolation function to predict a nominal characteristic for a class of event data based on prior values of the nominal characteristic. In other embodiments, the anomaly detection task function f(x) 322 may comprise a propagator/estimator function, such as a Kalman filter, to predict nominal values as estimator states. For example, the Kalman filter may provide predictions for future nominal values given a set of network (or environmental) parameters and/or measurements observed over time.

In some embodiments, the quantum network assessment function 132 may receive as task data 324 a subset of the network integrity data 125 selected by the network integrity monitor 120. The quantum oracle 320 may then initialize the set of quantum basis states 328 with a uniform superposition, with one or more respective quantum basis states corresponding to one or more instances of event data represented by the task data 324. The quantum oracle 320 may perform a phase inversion of the set of quantum basis states 328 by multiplying by negative one (−1), a phase of each quantum basis state that corresponds to a solution to an anomaly detection task function f(x) 322. Then, with the amplitude amplification quantum search algorithm 326, quantum network assessment function 132 may apply a diffusions operator (e.g., a Grover diffusion operator) to the set of quantum basis states 328 to amplify an amplitude of each basis state of the set of quantum basis states 328 that comprises a solution to an anomaly detection task function f(x) 322, to and attenuate an amplitude of each basis state of the set of quantum basis states 328 that comprises a non-solution to the anomaly detection task function f(x) 322. The diffusions operator performs an inversion of each basis state about the average amplitude of the basis state vectors. The diffusion operator decreases the amplitudes of the basis states that are greater than the average of the amplitudes, and increases the amplitudes of basis states that are less than the average of the amplitudes. Accordingly, one iteration of applying the quantum oracle and the diffusions operator serves to increase the amplitudes of the basis states that are solutions to an anomaly detection task function f(x) 322, and serves to decrease the amplitudes of the basis states that are not solutions to an anomaly detection task function f(x) 322, in order to yield a first pass at predicting whether the collected task data 324 represents a set of event data associated with an emerging or occurring threat event. Iteratively repeating application of the phase inversion and diffusions operator a multiple number of times will further introduce deviations in the observable amplitudes of basis states, causing basis states that are solutions to further increase in amplitude and basis states that are not solutions to further decrease in amplitude. As such, the greater number of iterations in which these steps are performed, the higher the degree of confidence will be that the basis states with the greater amplitudes are solutions to the anomaly detection task function f(x) 322.

In some embodiments, the network integrity monitor 120 passes to the quantum network assessment function 132 a confidence parameter indicating the degree of confidence desired from the quantum network assessment function 132. The quantum network assessment function 132 may then iteratively repeat application of the phase inversion and diffusions operator a number of times based on the confidence parameter to achieve the indicated level of confidence in the accuracy of the threat profile. Once the specified number of iterations are performed, the amplitude amplification quantum search algorithm 326 measures the state of the quantum basis states 328, outputting the results to the quantum oracle 320. The quantum oracle 320 may correlate the results with the task data 324 to identify instances of network events that have a high probability of being anomalous (and therefore potential threats). In some embodiments, the quantum oracle 320 may apply a network operator defining a threshold to quantum basis state amplitudes to determine when an instance of event data is anomalous or nominal. The results of the search task from the quantum oracle 320 may form, at least in part, the basis of the threat profile that may be reported back to the network integrity monitor 120.

Figure 4A:
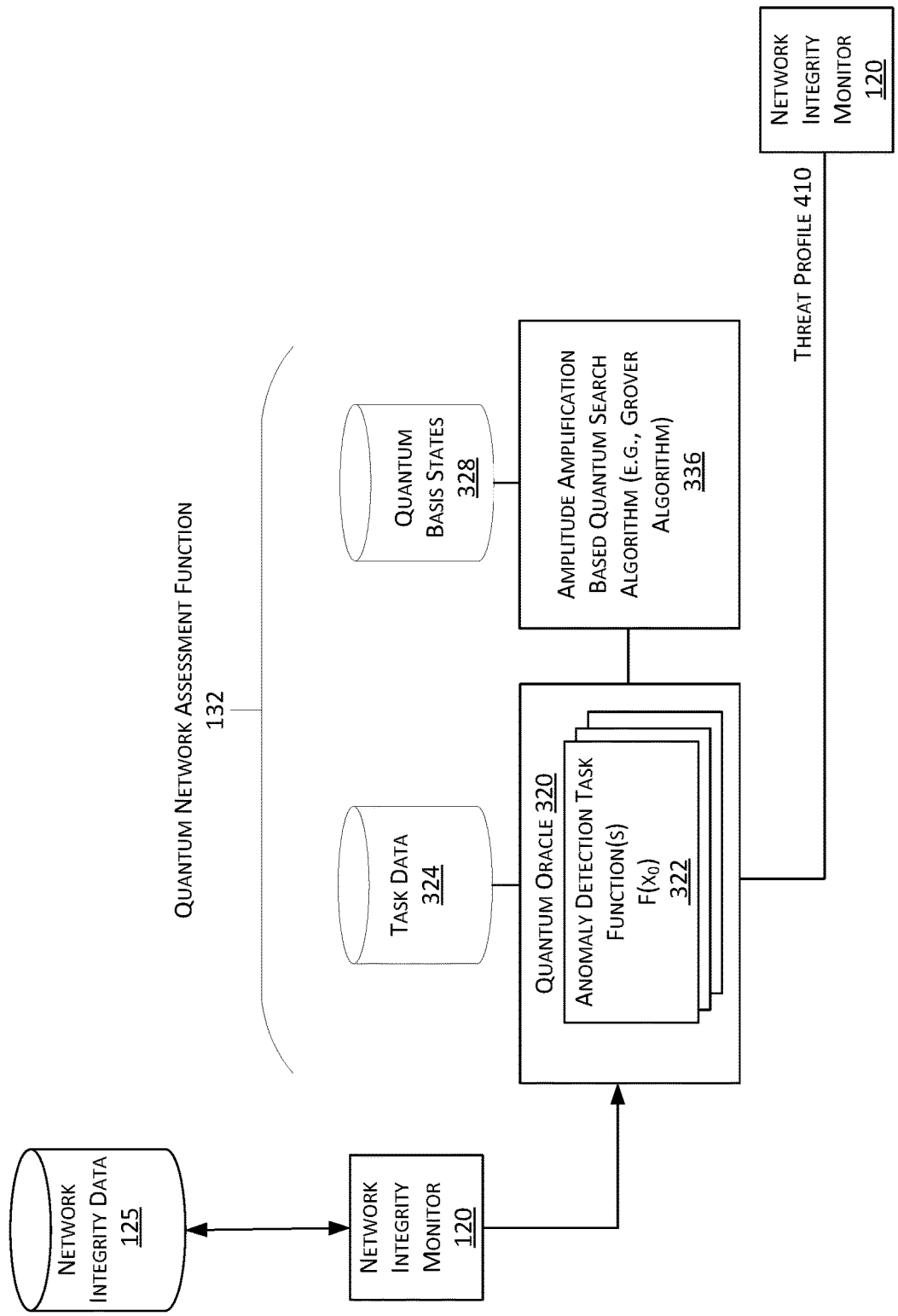
FIGS. 4A-4D are diagrams illustrating example quantum network assessment functions, in accordance with some embodiments described herein.

FIG. 4A is a data flow diagram illustrating an example embodiment of quantum network assessment function 132 as discussed above, where the network integrity monitor 120 submits a subset of network integrity data 125 to the quantum network assessment function 132 for use as task data 324. The quantum oracle 320 applies the one or more anomaly detection task functions 322 to the amplitude amplification-based quantum search algorithm 336 to identify instances of event data that, per the anomaly detection task function(s) 322, represent anomalous event data instances. The resulting search solution output from the quantum oracle 320 may comprise a threat profile 410 that may be clustered or otherwise used by the network integrity monitor 120 to determine and/or initiate a threat response.

Figure 4B:
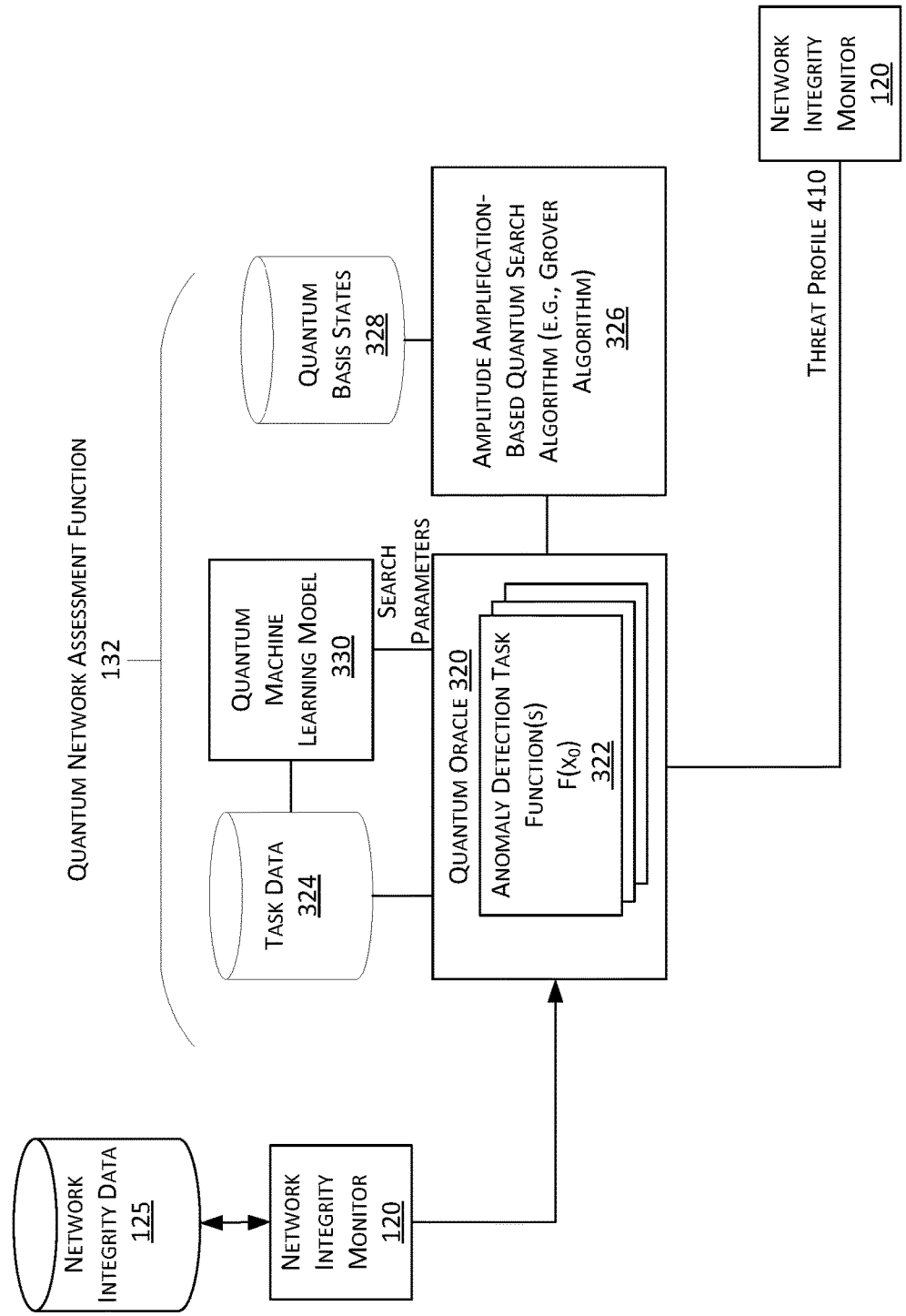

FIG. 4B is a data flow diagram illustrating an example embodiment of quantum network assessment function 132. In this example, the quantum network assessment function 132 further comprises a quantum machine learning model 330. The quantum machine learning model 330 may be trained to input the task data 324 and predict or infer patterns of network activity that correlate with network threats. In some embodiments, the quantum machine learning model 330 may output one or more predictions of threat classes based on classifying patterns of network activity represented in the task data 324. Based on the patterns of network activity, the quantum machine learning model 330 may output one or more search parameters to the quantum oracle 320 that are used to adjust the operations of the one or more anomaly prediction task function(s) 322. For example, the one or more anomaly prediction task function(s) 322 may be adjusted to focus their search task based on the multiclass classification output from the quantum machine learning model 330. In some embodiments, the quantum network assessment function 132 may configure the one or more anomaly prediction task function(s) 322 by selecting task functions from the task function library 332 to include in the one or more anomaly prediction task function(s) 322 based on the multiclass classification output from the quantum machine learning model 330, in order to apply a set of task functions to the search task optimally applicable to the potential threat classes present in the task data 324. The resulting search solution output from the quantum oracle 320 may comprise a threat profile 410 that may be clustered or otherwise used by the network integrity monitor 120 to determine and/or initiate a threat response.

Figure 4C:
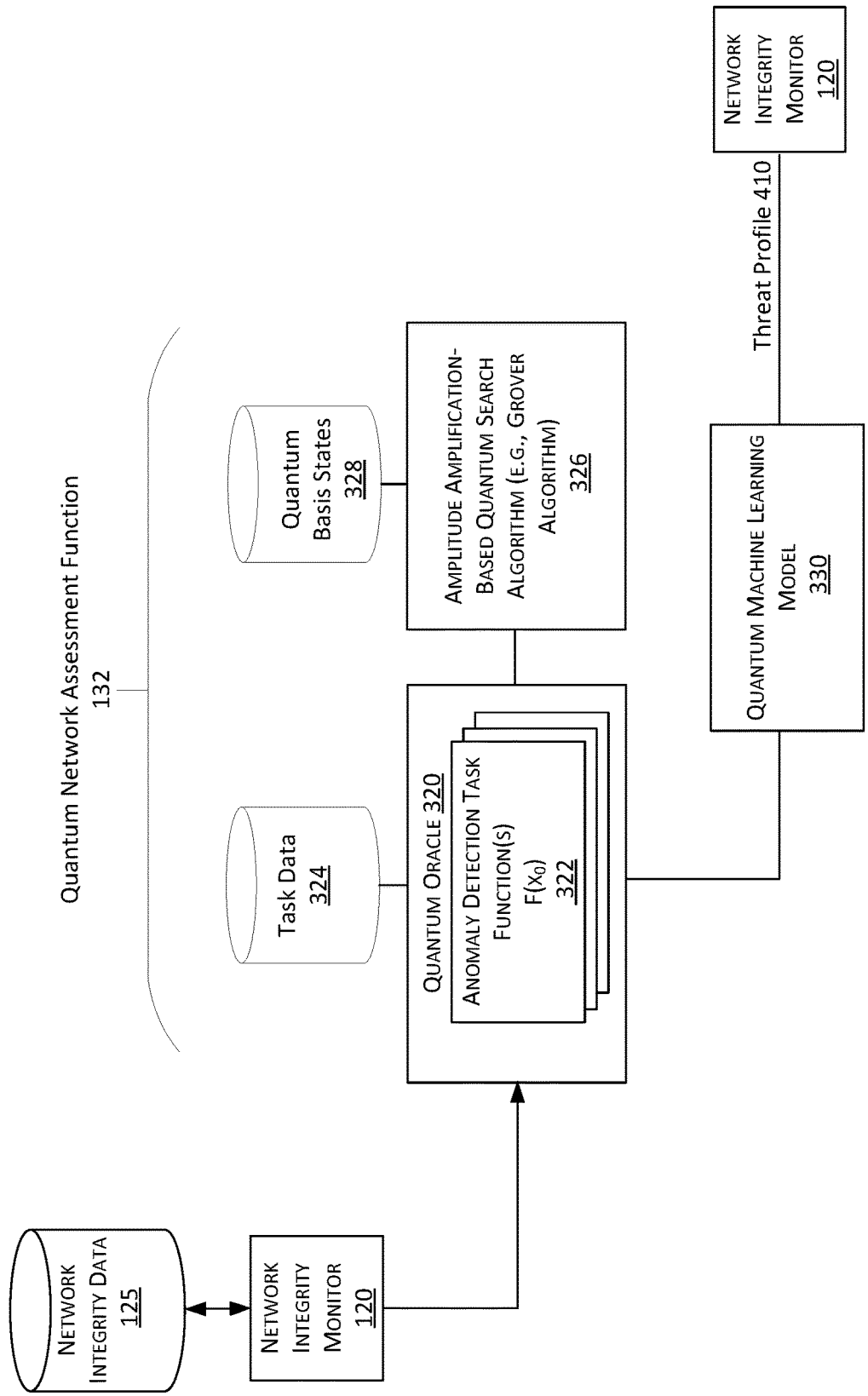

FIG. 4C is a data flow diagram illustrating another example embodiment of quantum network assessment function 132. In this example, the quantum network assessment function 132 further comprises a quantum machine learning model 330 that may be trained to input search results provided from the quantum oracle 320 to predict or infer patterns of network activity that correlate with network threats. The network integrity monitor 120 submits a subset of network integrity data 125 to the quantum network assessment function 132 for use as task data 324. The quantum oracle 320 applies the one or more anomaly detection task functions 322 to the amplitude amplification-based quantum search algorithm 336 to identify instances of event data that, per the anomaly detection task function(s) 322 represent anomalous event data instances. In some instances, the resulting search solution output from the quantum oracle 320 may comprise a very complex search solution, especially where anomalous event data instances are the results of events simultaneously occurring from multiple threat vectors. Conversely, the resulting search solution output from the quantum oracle 320 may indicate that individual incidents of anomalous event data within the task data 324 appear to be only di minimis in nature, but that when considered holistically form a pattern indicative of threatening activity. Accordingly, the quantum machine learning model 330 may input search results provided from the quantum oracle 320, and from those search results predict or infer a threat profile 410 that may include a single or multiclass threat classification characterizing the task data.

Figure 4D:
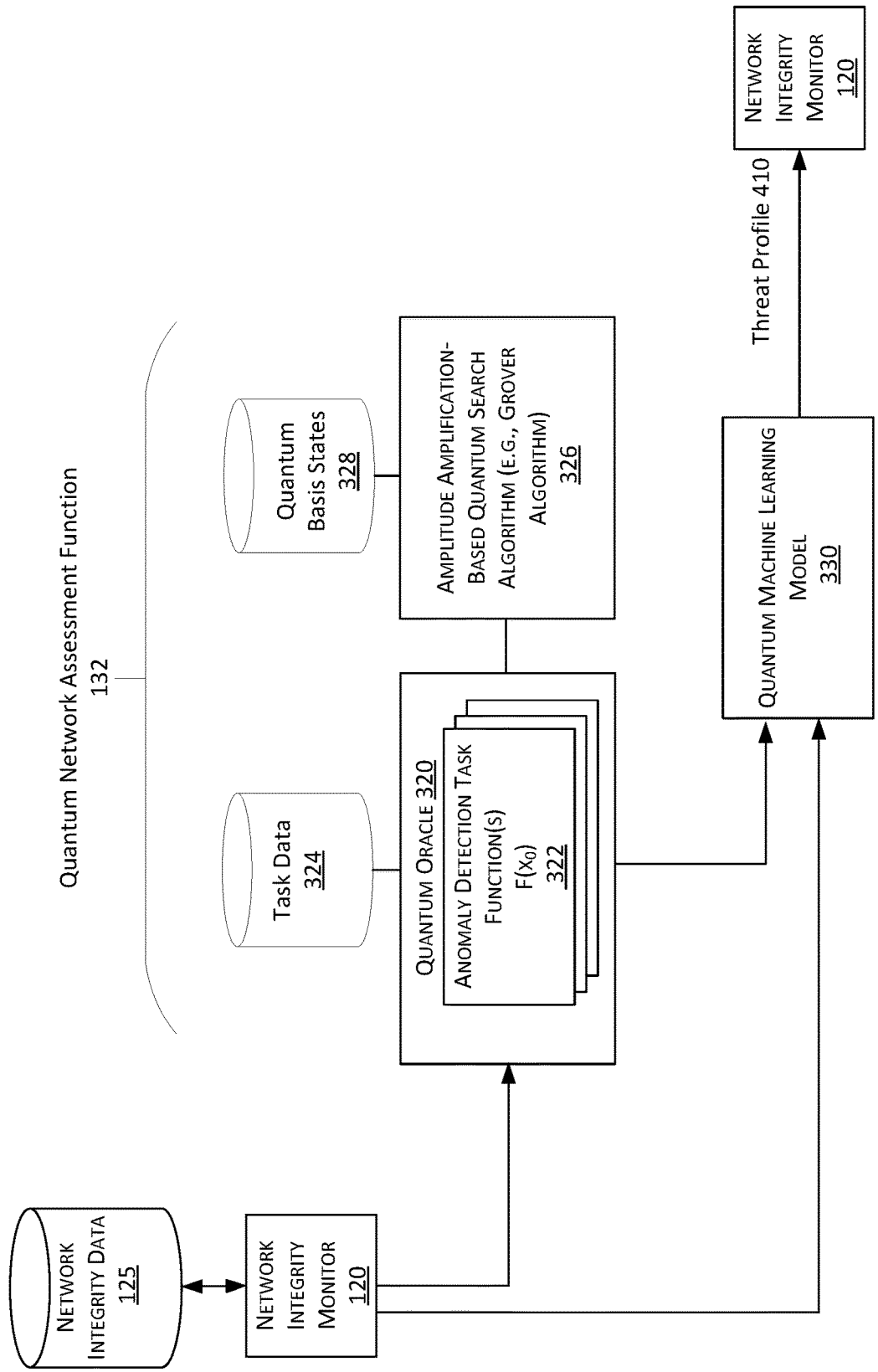

FIG. 4D is a data flow diagram illustrating another example embodiment of quantum network assessment function 132. In this example, the quantum network assessment function 132 comprises a quantum machine learning model 330 that is trained to predict a threat profile 410 based on the task data 324 in combination with search result output from the quantum oracle 320. The network integrity monitor 120 submits a subset of network integrity data 125 to the quantum network assessment function 132 for use as task data 324. The quantum oracle 320 applies the one or more anomaly detection task functions 322 to the amplitude amplification-based quantum search algorithm 336 to identify instances of event data that, per the anomaly detection task function(s) 322 represent anomalous event data instances. The quantum machine learning model 330 may input search results provided from the quantum oracle 320, and from those search results predict or infer a threat profile 410 that may include a single or multiclass threat classification characterizing the task data. Such a prediction by the quantum machine learning model 330 may be more accurate than a prediction made from considering in isolation either just the task data 324 or the search solution from quantum oracle 320.

As mentioned above, the network integrity monitor 120 may determine which instances of event data are passed to the quantum network assessment function 132 to form task data 324. The network integrity monitor 120 may also specify to the quantum network assessment function 132 to search for different types of anomalies indicative of a network threats (e.g., by selecting different sets of task functions from the task function library 332). In some embodiments, the network integrity monitor 120 may perform one or more troubleshooting processes using the quantum network assessment function 132 in response to a suspected threat. For example, in one implementation the network integrity monitor 120 may execute a process that starts with passing the quantum network assessment function 132 a sample of event data from the network integrity data 125 corresponding to a network segment. If the resulting threat profile indicates that a threat is detected by the quantum network assessment function 132, then in an iterative fashion, larger samplings of network integrity data 125 from additional other network segments can similarly be sampled and passed to the quantum network assessment function 132 to determine if larger segments of the network environment 100 are similarly being affected by the network threat. In another implementation, the network integrity monitor 120 may execute a process that starts with a sample of network integrity data 125 from a large number of access networks 104 and/or other equipment. If the quantum network assessment function 132 produced a threat profile indicating that a threat is occurring or is in progress, then in an iterative fashion, samplings of event data (e.g., from network integrity data 125) from successively smaller subsets of event data can be passed to the quantum network assessment function 132 to narrow down and possibly isolate specific network equipment affected by the network threat.

Figure 5:
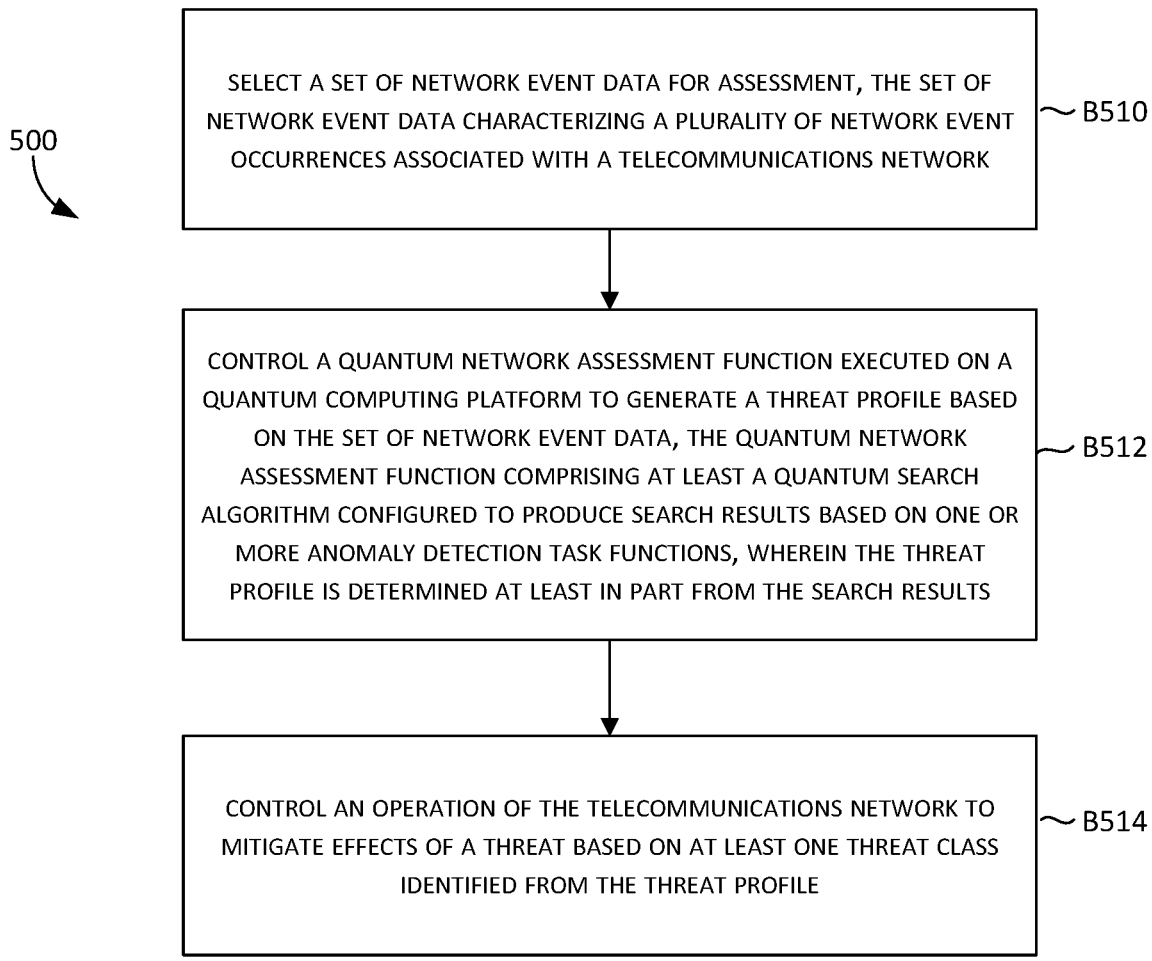
FIG. 5 is a flow chart illustrating an example method in accordance with some embodiments described herein.

FIG. 5 is a flow chart illustrating a method 500 for quantum-based network traffic anomaly detection, according to some embodiments. It should be understood that the features and elements described herein with respect to the method of FIG. 5 may be used in conjunction with, in combination with, or substituted for elements of any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 are implemented utilizing one or more processing units, such as the controller of an operator core network, an edge server, network server, a cloud computing environment, a RAN, a UE, and/or other processing units, as disclosed in any of the embodiments herein. In some embodiments, the method 500 may be implemented by components of a telecommunications network environment 100, such as is illustrated by FIG. 1 and may be implemented as operations on one or more processors and/or in conjunction with elements of method 500.

The method 500 at B510 includes selecting a set of network event data for assessment, the set of network event data characterizing a plurality of network event occurrences associated with a telecommunications network. For example, the set of network event data may comprise a subset of the network integrity data 125 selected by the network integrity monitor 120. In some embodiments, the quantum network assessment function is provided a subset of the network integrity data that corresponds to event data relevant to a particular network segment, partition, domain, or slice of the network environment 100. In some embodiments, the quantum network assessment function is provided a subset of the network integrity data that corresponds to a specified window or slice of time (e.g., the most recently collected 5, 10, or 60 minutes of time, or duration selected to assess network patterns that may have been associated with known past threats). The selected task data may then be processed by the quantum computing-based network assessment function to determine, within a prescribed degree of confidence, the possibility that one or more anomalies indicative of network threats may be present in the evaluated data. In some embodiments, the set of network event data comprises data such as, but not limited to: network performance metric measurements, data traffic flow rates, operator core network traffic patterns, a data traffic latency statistic, data traffic jitter, network infrastructure equipment status, a dropped packet statistic, network resource access attempts, sensor data, environmental data, a temperature measurement, a humidity measurement, a barometric pressure measurement, seismic sensor data, data received from an external reporting source, and data received from a weather monitoring agency.

The method 500 at B512 includes controlling a quantum network assessment function executed on a quantum computing platform to generate a threat profile based on the set of network event data, the quantum network assessment function comprising at least a quantum search algorithm configured to produce search results based on one or more anomaly detection task functions, wherein the threat profile is determined at least in part from the search results. The method may further include controlling the quantum network assessment function to select the one or more anomaly detection task functions. For example the quantum network assessment function may be controlled to select the one or more anomaly detection task functions from a task function library accessible by the quantum network assessment function. In some embodiments, the quantum network assessment function may comprise a quantum oracle, quantum search algorithm, and/or a quantum machine learning model, as shown in FIG. 3. In some embodiments, the quantum computing platform may comprise a hybrid quantum-classical computing platform. The quantum network assessment function may comprise a combination of classical computing and quantum computing elements (e.g., a hybrid classical-quantum algorithm) that are executed by respective classical and quantum computing processing resources of the quantum computing platform. In some embodiments, one or more quantum computing elements of the quantum network assessment function 132 may be performed using classical processing resources executing the quantum computing element using quantum simulation and/or emulation technologies. The threat profile may comprise one or more indications of anomalous event data identified by a search of task data that includes the set of network event data. One or more of the anomaly detection task functions may be configured to compute a prediction of a nominal characteristic of a parameter of network performance, as would be indicated by event data absent a presence of an active threat and search task data that includes the set of network event data for instances of event data not conforming to the nominal characteristic. When the quantum network assessment function includes one or more quantum machine learning (QML) models, threat profile may be further determined at least in part from a prediction of the one or more quantum machine learning models, inferred at least in part based on the set of network event data.

The method 500 at B514 includes controlling an operation of the telecommunications network to mitigate effects of a threat based on at least one threat class identified from the threat profile. In some embodiments the network integrity monitor may receive an initial threat profile that includes the results generated by the quantum network assessment function and apply a clustering algorithm to cluster the results based on a selected criteria to produce a refined threat profile. In some embodiments, the quantum network assessment function may include a clustering algorithm to cluster the results based on a selected criteria to produce a refined threat profile that it provides to the network integrity monitor. The network integrity monitor may correlate cluster patterns based on the threat profile with one or more predefined response profiles to trigger response protocols designed to counter or diminish negative effects on network operations—given the type of threat that produces the type cluster pattern derived from the threat profile. The response protocols may include triggering mitigating steps to control network operations such as, but not limited to, generating an alarm, locking or disabling accounts, reconfiguring access to network resources, reconfiguring network infrastructure equipment, switching traffic patterns, rerouting network traffic, and/or initiating other response processes.

Figure 6:
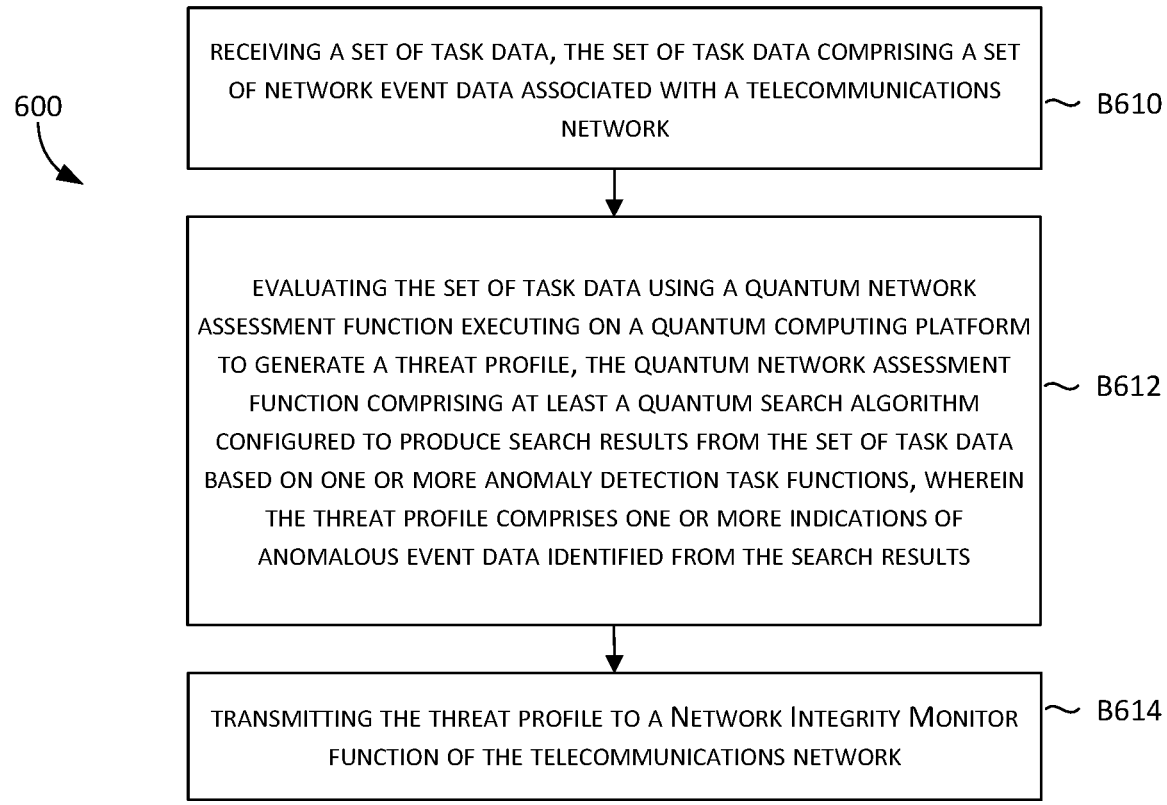
FIG. 6 is a flow chart illustrating another example method in accordance with some embodiments described herein.

FIG. 6 is a flow chart illustrating a method 500 for quantum-based network traffic anomaly detection, according to some embodiments. It should be understood that the features and elements described herein with respect to the method of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa. In some embodiments, elements of method 600 are implemented utilizing one or more processing units, such as processing units of a quantum computing platform, such as quantum computing platform 130. In some embodiments, elements of method 600 are implemented utilizing a network environment 100, as disclosed above, and may be implemented as operations on one or more processors and/or in conjunction with elements of method 600.

The method 600 at B610 includes receiving a set of task data, the set of task data comprising a set of network event data associated with a telecommunications network. For example, the set of network event data may comprise a subset of the network integrity data 125 selected by the network integrity monitor 120. In some embodiments, the quantum network assessment function is provided a subset of the network integrity data that corresponds to event data relevant to a particular network segment, partition, domain, or slice of the network environment 100. In some embodiments, the quantum network assessment function is provided a subset of the network integrity data that corresponds to a specified window or slice of time (e.g., the most recently collected 5, 10, or 60 minutes of time, or duration selected to assess network patterns that may have been associated with known past threats). The selected task data may then be processed by the quantum computing-based network assessment function to determine, within a prescribed degree of confidence, the possibility that one or more anomalies indicative of network threats may be present in the evaluated data. In some embodiments, the set of network event data comprises data such as, but not limited to: network performance metric measurements, data traffic flow rates, operator core network traffic patterns, a data traffic latency statistic, data traffic jitter, network infrastructure equipment status, a dropped packet statistic, network resource access attempts, sensor data, environmental data, a temperature measurement, a humidity measurement, a barometric pressure measurement, seismic sensor data, data received from an external reporting source, and data received from a weather monitoring agency.

The method 600 at B612 includes evaluating the set of task data using a quantum network assessment function executing on a quantum computing platform to generate a threat profile, the quantum network assessment function comprising at least a quantum search algorithm configured to produce search results from the set of task data based on one or more anomaly detection task functions, wherein the threat profile comprises one or more indications of anomalous event data identified from the search results. One or more of the anomaly detection task functions may be configured to compute a prediction of a nominal characteristic of a parameter of network performance as would be indicated by event data absent a presence of an active threat and search task data that includes the set of network event data for instances of event data not conforming to the nominal characteristic. The method may further include controlling the quantum network assessment function to select the one or more anomaly detection task functions. For example, the quantum network assessment function may be controlled to select the one or more anomaly detection task functions from a task function library accessible by the quantum network assessment function. In some embodiments, the quantum network assessment function may comprise a quantum oracle, quantum search algorithm, and/or a quantum machine learning model, as shown in FIG. 3. The quantum network assessment function may comprise an amplitude amplification-based quantum search algorithm and a quantum oracle, wherein the amplitude amplification-based quantum search algorithm performs quantum operations on one or more quantum states of the quantum computing platform based on the one or more anomaly detection task functions, as defined by the quantum oracle to identify anomalous event data from the set of task data.

In some embodiments, the quantum network assessment function further comprises one or more quantum machine learning (QML) models. In such embodiments, the method may include, using the one or more quantum machine learning models, predicting one or more threat classes based on classifying patterns of network activity represented in the set of task data, and adjusting the one or more anomaly detection task functions based on the one or more threat classes. The method may also, or instead, include using the one or more quantum machine learning models to predict one or more threat classifications characterizing the set of task data based on the search results, wherein the threat profile is based at least in part on the prediction of one or more threat classifications. In some embodiments, predicting the one or more threat classifications characterizing the set of task data may be based on inputting the search results and the set of task data.

The method 600 at B614 includes transmitting the threat profile to a network integrity monitor function of the telecommunications network. In some embodiments the network integrity monitor may receive an initial threat profile that includes the results generated by the quantum network assessment function and may apply a clustering algorithm to cluster the results based on a selected criteria to produce a refined threat profile. In some embodiments, the quantum network assessment function may include a clustering algorithm to cluster the results based on a selected criteria to produce a refined threat profile that it provides to the network integrity monitor. The network integrity monitor may correlate cluster patterns based on the threat profile with one or more predefined response profiles to trigger response protocols designed to counter or diminish negative effects on network operations--given the type of threat that produces the type of cluster pattern derived from the threat profile. The response protocols may include triggering mitigating steps to control network operations such as, but not limited to, generating an alarm, locking or disabling accounts, reconfiguring access to network resources, reconfiguring network infrastructure equipment, switching traffic patterns, rerouting network traffic, and/or initiating other response processes.

Figure 7:
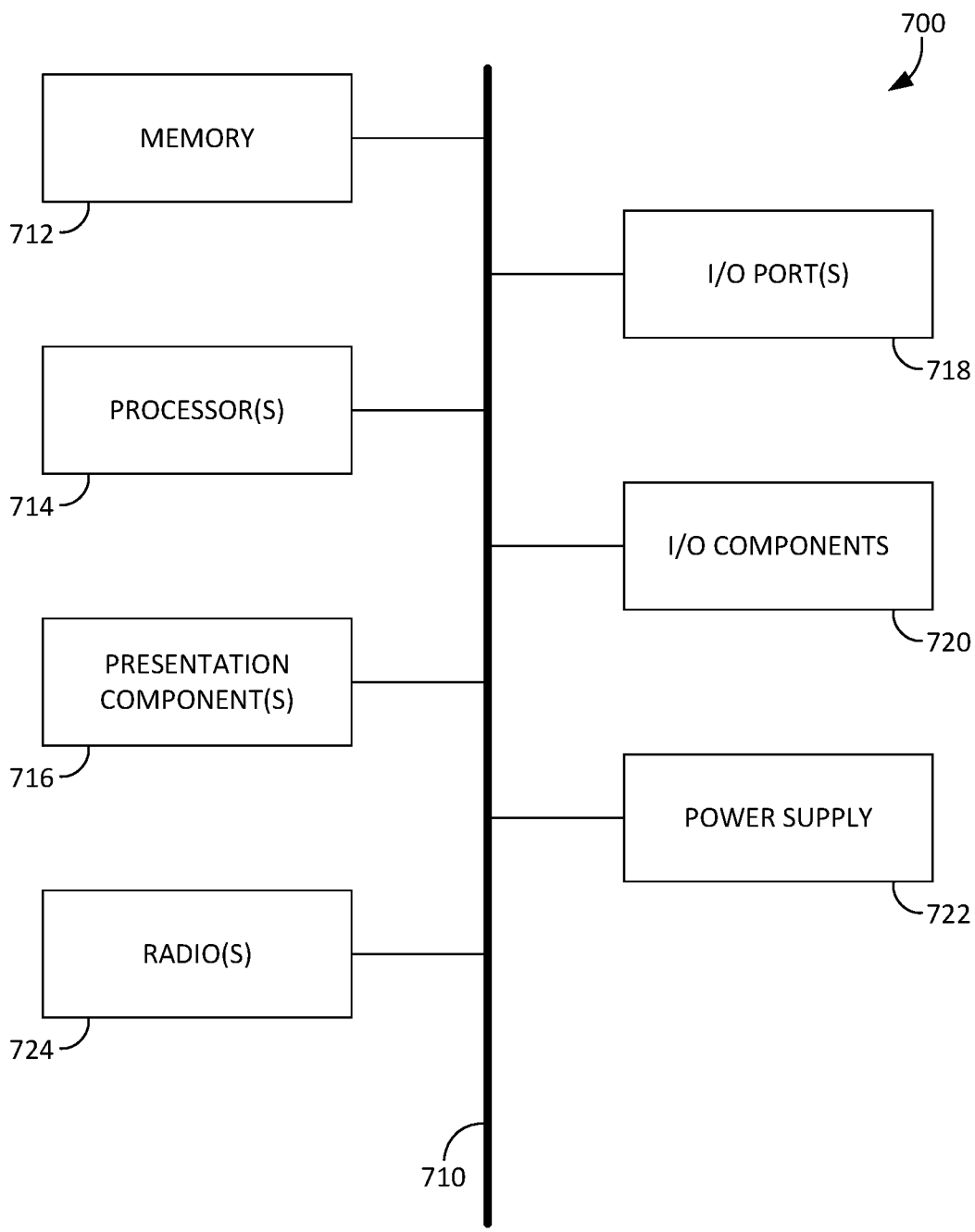
FIG. 7 is diagram illustrating an example computing environment according to an embodiment.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein, and nor should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more buses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, network integrity monitor 120, quantum network assessment function 132 and/or network integrity data 125 may be executed at least in part by computing device 700. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

In some embodiments, the time validation gateway, for example, or other elements as described in any of the examples of this disclosure may be implemented at least in part by code executed by the one or more processors(s) 514. In some embodiments, the one or more processors(s) 514 may comprise a combination of one or more classical computing processors (such as classical computing processing unit(s) 306) and one or more quantum processors (such as quantum processing unit(s) 305) for implementing the quantum network assessment function 132.

Computing device 700 typically includes a variety of computer-readable media. Computer-readable media can be any available media that can be accessed by computing device 700 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or non-volatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. One or more presentation components 716 presents data indications to a person or other device. Exemplary one or more presentation components 716 include a display device, speaker, printing component, vibrating component, etc. I/O ports 718 allow computing device 700 to be logically coupled to other devices, including I/O components 720, some of which may be built into computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the RAN 202, access network 204, UE 110, operator core network 106, and/or core network edge 105. Illustrative wireless telecommunications technologies include CDMA, GPRS, TDMA, GSM, and the like. Radio(s) 724 may additionally or alternatively facilitate other types of wireless communications including Wi-Fi, WiMAX, LTE, and/or other VOIP communications. In some embodiments, radio(s) 724 may support multimodal connections that include a combination of 3GPP radio technologies (e.g., 4G, 5G, and/or 6G) and/or non-3GPP radio technologies. As can be appreciated, in various embodiments, radio(s) 724 can be configured to support multiple technologies, and/or multiple radios can be utilized to support multiple technologies. In some embodiments, the radio(s) 724 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 8:
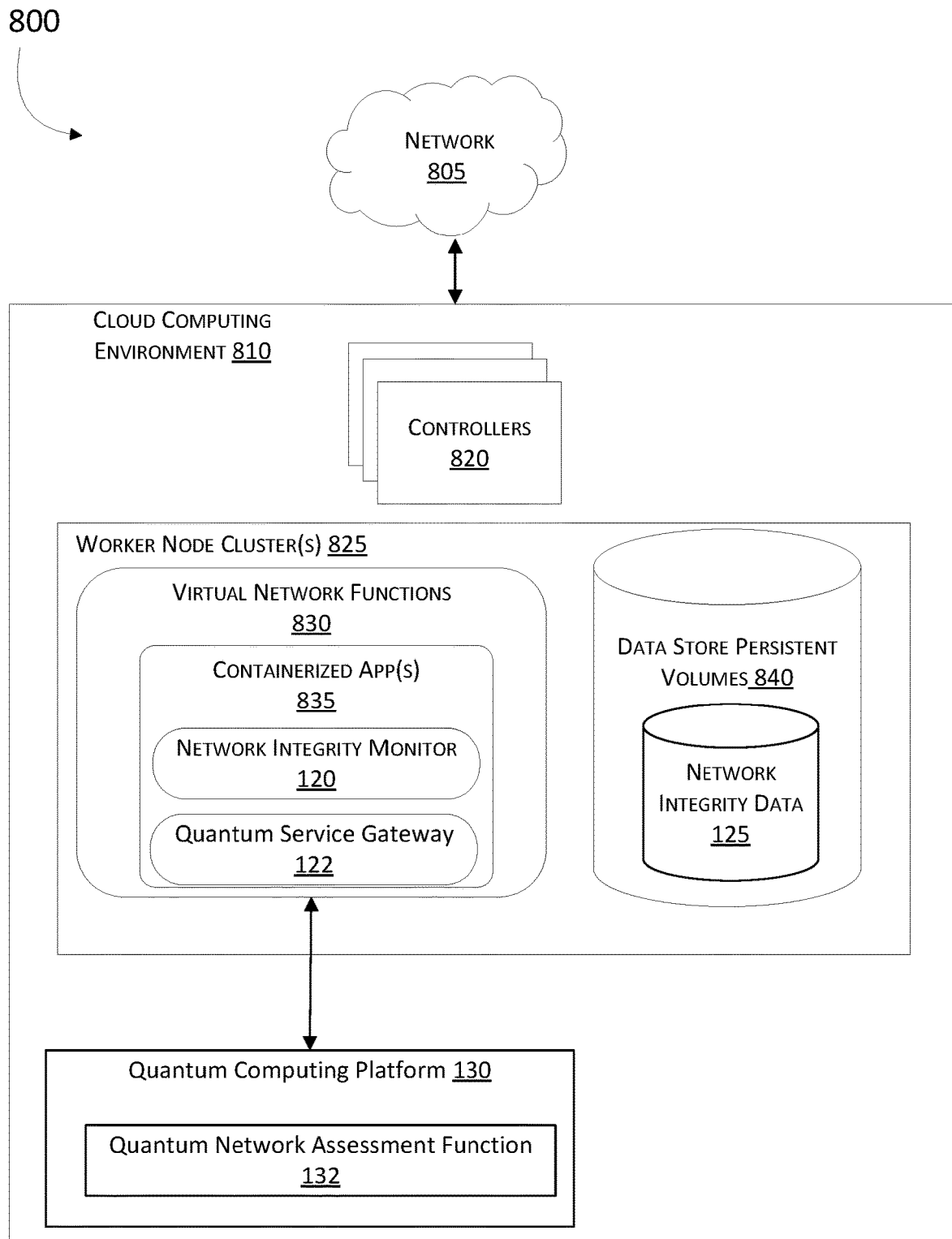
FIG. 8 is diagram illustrating an example cloud computing environment according to an embodiment.

Referring to FIG. 8, a diagram is depicted generally at 800 of an exemplary cloud computing environment 810 for implementing one or more aspects of quantum-based network traffic anomaly detection implemented by the systems and methods described herein, such as using the network integrity monitor 120 and/or quantum network assessment function 132, for example. Cloud computing environment 810 is but one example of a suitable cloud computing environment and is not intended to suggest any limitation as to the scope of use or functionality of the embodiments presented herein, and nor should cloud computing environment 810 be interpreted as having any dependency or requirement relating to any one or combination of components illustrated. In some embodiments, the cloud computing environment 810 is coupled to a network 805 and executed within operator core network 106, the core network edge 105, edge server 264, and/or data network 107, or otherwise coupled to the core network edge 105 or operator core network 106.

Cloud computing environment 810 includes one or more controllers 820 comprising one or more processors and memory. The controllers 820 may comprise servers of a data center. In some embodiments, the controllers 820 are programmed to execute code to implement at least one or more aspects of the network integrity monitor 120, quantum service gateway 122, and/or quantum network assessment function 132, and/or other network functions described herein. For example, in some embodiments the network integrity monitor 120, quantum service gateway 122, and/or quantum network assessment function 132 may be implemented at least in part as one or more virtual network functions (VNFs) 830 (which may include one or more container network functions (CNFs)) running on a worker node cluster 825 established by the controllers 820.

The cluster of worker nodes 825 may include one or more orchestrated Kubernetes (K8s) pods that realize one or more containerized applications 835. In other embodiments, another orchestration system may be used. For example, the worker nodes 825 may use lightweight Kubernetes (K3s) pods, Docker Swarm instances, and/or other orchestration tools. In some embodiments, one or more elements of the network environment 100 may be implemented by, or coupled to, the controllers 820 of the cloud computing environment 810 by operator core network 106 and/or core network edge 105. In some embodiments, data store 109 and/or network integrity data 125 may be implemented at least in part as one or more data store persistent volumes 840 in the cloud computing environment 810.

In various alternative embodiments, system and/or device elements, method steps, or example implementations described throughout this disclosure (such as the network integrity monitor, quantum network assessment function, network operator core, access networks, the quantum computing platform, or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random access memory (RAM), or any other form of permanent, semi-permanent, or temporary memory storage system of a device having a physical, tangible form. Program instructions include, but are not limited to, computer-executable instructions executed by computer system processors and hardware description languages, such as Very High Speed Integrated Circuit (VHSIC) Hardware Description Language (VHDL).

As used herein, terms such as network operator core, nodes, network nodes, modules, server, application function, network function, access network, user equipment (UE), gateway, data store, and other terms derived from these words refer to the names of elements that would be understood by one skilled in the art of wireless telecommunications and related industries, and are not used herein as nonce words or nonce terms for the purpose of invoking 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system comprising:
one or more processors; and
one or more computer-readable media storing computer-usable instructions that, when executed by the one or more processors, cause the one or more processors to:
select a set of network event data for assessment, the set of network event data characterizing a plurality of network event occurrences associated with a telecommunications network;
control a quantum network assessment function executed on a quantum computing platform to generate a threat profile based on the set of network event data, the quantum network assessment function comprising at least a quantum search algorithm configured to perform a search task defined by one or more anomaly detection task functions to search the set of network event data for indications of at least one defined anomaly, wherein the threat profile is determined at least in part from search results of the search task; and control an operation of the telecommunications network based on correlating at least one threat class identified from the threat profile with one or more predefined response profiles.

2. The system of claim 1, the one or more processors further to:
control the quantum network assessment function to select the one or more anomaly detection task functions.

3. The system of claim 1, the one or more processors further to:
control the quantum network assessment function to select the one or more anomaly detection task functions from a task function library accessible by the quantum network assessment function.

4. The system of claim 1, the one or more processors further to:
apply a clustering algorithm to the search results to derive the threat profile.

5. The system of claim 1, wherein the set of network event data comprises at least one of:
network performance metric measurements, data traffic flow rates, operator core network traffic patterns, a data traffic latency statistic, data traffic jitter, network infrastructure equipment status, a dropped packet statistic, network resource access attempts, sensor data, environmental data, a temperature measurement, a humidity measurement, a barometric pressure measurement, seismic sensor data, data received from an external reporting source, and data received from a weather monitoring agency.

6. The system of claim 1, wherein the threat profile comprises one or more indications of anomalous event data identified by a search of task data that includes the set of network event data.

7. The system of claim 1, wherein at least one of the one or more anomaly detection task functions is configured to:
compute a prediction of a nominal characteristic of a parameter of network performance as would be indicated by event data absent a presence of an active threat; and
search task data that includes the set of network event data for instances of event data not conforming to the nominal characteristic.

8. The system of claim 1, the quantum network assessment function further comprising one or more quantum machine learning (QML) models, wherein the threat profile is further determined at least in part from a prediction of the one or more quantum machine learning models, inferred at least in part based on the set of network event data.

9. A method comprising:
receiving a set of task data, the set of task data comprising a set of network event data associated with a telecommunications network;
evaluating the set of task data using a quantum network assessment function executing on a quantum computing platform to generate a threat profile, the quantum network assessment function comprising at least a quantum search algorithm configured to perform a search task defined by one or more anomaly detection task functions to search the set of network event data for indications of at least one defined anomaly, wherein the threat profile comprises one or more indications of anomalous event data identified from search results of the search task; and
transmitting the threat profile to a network integrity monitor function of the telecommunications network, the network integrity monitor function configured to correlate the threat profile with one or more predefined response profiles to trigger one or more response protocols.

10. The method of claim 9, wherein the quantum network assessment function comprises an amplitude amplification-based quantum search algorithm and a quantum oracle; and
wherein the amplitude amplification-based quantum search algorithm performs quantum operations on one or more quantum states of the quantum computing platform based on the one or more anomaly detection task functions, as defined by the quantum oracle to identify anomalous event data from the set of task data.

11. The method of claim 9, the method further comprising:
selecting the one or more anomaly detection task functions from a task function library accessible by the quantum network assessment function.

12. The method of claim 9, the one or more anomaly detection task functions:
computing a prediction of a nominal characteristic of a parameter of network performance, as would be indicated by event data absent a presence of an active threat; and
searching the set of task data that includes the set of network event data for instances of event data not conforming to the nominal characteristic.

13. The method of claim 9, further comprising:
clustering the search results to derive the threat profile.

14. The method of claim 9, the quantum network assessment function further comprising one or more quantum machine learning (QML) models, the method further comprising:
with the one or more quantum machine learning models, predicting one or more threat classes based on classifying patterns of network activity represented in the set of task data; and
adjusting the one or more anomaly detection task functions based on the one or more threat classes.

15. The method of claim 9, the quantum network assessment function further comprising one or more quantum machine learning (QML) models, the method further comprising:
with the one or more quantum machine learning models, predicting one or more threat classifications characterizing the set of task data based on the search results; and
wherein the threat profile is based at least in part on the predicting one or more threat classifications.

16. The method of claim 15, the method further comprising:
with the one or more quantum machine learning models, predicting the one or more threat classifications characterizing the set of task data based on inputting the search results and the set of task data; and
wherein the threat profile is based at least in part on the predicting one or more threat classifications.

17. A telecommunications network, the network comprising:
an operator core network;
at least one access network coupled to the operator core network, wherein the at least one access network communicates uplink (UL) and downlink (DL) signals between the operator core network and one or more user equipment (UEs) within a coverage area of the at least one access network;

a network integrity monitor, the network integrity monitor to execute one or more operations to:

select a set of network event data for assessment, the set of network event data characterizing a plurality of network event occurrences associated with the telecommunications network;

control a quantum network assessment function executed on a quantum computing platform to generate a threat profile based on the set of network event data, the quantum network assessment function comprising at least a quantum search algorithm configured to perform a search task defined by one or more anomaly detection task functions to search the set of network event data for indications of at least one defined anomaly, wherein the threat profile is determined at least in part from search results of the search task; and control an operation of the telecommunications network based on correlating at least one threat class identified from the threat profile with one or more predefined response profiles.

18. The network of claim 17, the network integrity monitor further to execute one or more operations to:

control the quantum network assessment function through at least one application programing interface (API) of an application function exposed by a network exposure function of the operator core network.

19. The network of claim 17, the network integrity monitor further to execute one or more operations to:

control the quantum network assessment function to select the one or more anomaly detection task functions.

20. The network of claim 17, the quantum network assessment function further comprising one or more quantum machine learning (QML) models, wherein the threat profile is further determined at least in part from a prediction of the one or more quantum machine learning models, inferred at least in part based on the set of network event data.

* * * * *